US012634179B2

(12) United States Patent
Miwa et al.

(10) Patent No.: US 12,634,179 B2
(45) Date of Patent: May 19, 2026

(54) COMMUNICATION DEVICE AND SIGNAL DEMODULATION METHOD

(71) Applicant: OMRON Corporation, Kyoto (JP)

(72) Inventors: Yusuke Miwa, Kyoto (JP); Tatsuo Yoshida, Kyoto (JP)

(73) Assignee: OMRON Corporation, Kyoto (JP)

( * ) Notice: Subject to any disclaimer, the term of this patent is extended or adjusted under 35 U.S.C. 154(b) by 24 days.

(21) Appl. No.: 18/788,056

(22) Filed: Jul. 29, 2024

(65) Prior Publication Data

US 2025/0055736 A1    Feb. 13, 2025

(30) Foreign Application Priority Data

Aug. 8, 2023    (JP) .................................. 2023-129407

(51) Int. Cl.
*H04L 27/12*        (2006.01)
*H04L 25/02*        (2006.01)
*H04L 27/14*        (2006.01)
(52) U.S. Cl.
CPC .......... *H04L 27/12* (2013.01); *H04L 25/0202* (2013.01); *H04L 27/14* (2013.01)

(58) Field of Classification Search
CPC ...... H04L 27/14; H04L 27/12; H04L 25/0202
See application file for complete search history.

(56) References Cited

U.S. PATENT DOCUMENTS

2009/0096519 A1*    4/2009   El-Agha ................ H03D 3/006
                                                              329/300

FOREIGN PATENT DOCUMENTS

WO            2010110131            9/2010

* cited by examiner

*Primary Examiner* — Rahel Guarino
(74) *Attorney, Agent, or Firm* — JCIPRNET

(57)            ABSTRACT

A communication device (10) includes a reception part (20) demodulating a signal subjected to frequency shift keying by using binary values. The reception part has: a detection part, detecting a first bit, which is one of high and low bits along a time line; and an estimation part, estimating presence of a second bit based on a length of the ongoing time during which the first bit cannot be detected.

15 Claims, 9 Drawing Sheets

COMMUNICATION DEVICE AND SIGNAL DEMODULATION METHOD

CROSS-REFERENCE TO RELATED APPLICATION

This application claims the priority benefit of Japan application serial no. 2023-129407, filed on Aug. 8, 2023. The entirety of the above-mentioned patent application is hereby incorporated by reference herein and made a part of this specification.

BACKGROUND

Technical Field

The disclosure relates to a communication device and a signal demodulation method.

Description of Related Art

Radio frequency identification (RFID) systems are used in various fields, such as logistics management, production management, entrance and exit management.

PRIOR ART DOCUMENT(S)

Patent Document(s)

[Patent Document 1] International Publication No. WO2010110131

RFID systems which utilize electromagnetic waves (electromagnetic fields) in the low frequency (LF) band and in which tags transmit frequency shift keying signals to RFID readers/writers are also widely used. In the field where such RFID system is applied, for example, the electromagnetic waves transmitted by other RFID systems or other machines may become interference noises, and the communication stability in the case of communication of a tag with an RFID reader/writer may deteriorate.

SUMMARY

An aspect of the disclosure provides a communication device. The communication device includes a reception part, demodulating a signal subjected to frequency shift keying by using a high bit and a low bit that are binary values. The reception part has: a detection part, detecting a first bit, which is one of the high bit and the low bit, from the signal that is received along a time line; and an estimation part, estimating presence of a second bit, which is a bit different from the first bit, based on a length of the ongoing time during which the detection part is unable to detect the first bit. According to the aspect, a communication device capable of reducing communication errors can be realized.

Another aspect of the disclosure provides a communication device. The communication device includes a reception part, demodulating a signal subjected to frequency shift keying by using a high bit and a low bit that are binary values. The reception part further has: a high bit detection part, detecting the high bit along a time line from the signal that is received; a low bit estimation part, estimating presence of the low bit and outputting a first bit string in which the signal is temporarily demodulated based on a length of the ongoing time during which the high bit detection part is unable to detect the high bit; a low bit detection part, detecting the low bit along the time line from the signal that is received; a high bit estimation part, estimating presence of the high bit and outputting a second bit string in which the signal is temporarily demodulated based on a length of the ongoing time during which the low bit detection part is unable to detect low bits; a demodulation part, outputting a third bit string in which the signal is temporarily demodulated from the signal that is received; and a bit determination part, determining a bit string in which the signal is demodulated through comparison among the first bit string, the second bit string, and the third bit string. According to the aspect, a communication device capable of reducing communication errors can be realized.

Yet another aspect of the disclosure provides a signal modulation method. The signal modulation method is a signal demodulation method for demodulating a signal subjected to frequency shift keying by using a high bit and a low bit that are binary values. The signal demodulation method includes: a step of detecting a first bit, which is one of the high bit and the low bit, from the signal along a time line; and a step of estimating presence of a second bit, which is a bit different from the first bit, based on a length of the ongoing time during which the first bit is unable to be detected. According to the aspect, a signal demodulation method capable of reducing communication errors is realized.

DESCRIPTION OF THE EMBODIMENTS

Figure 1:
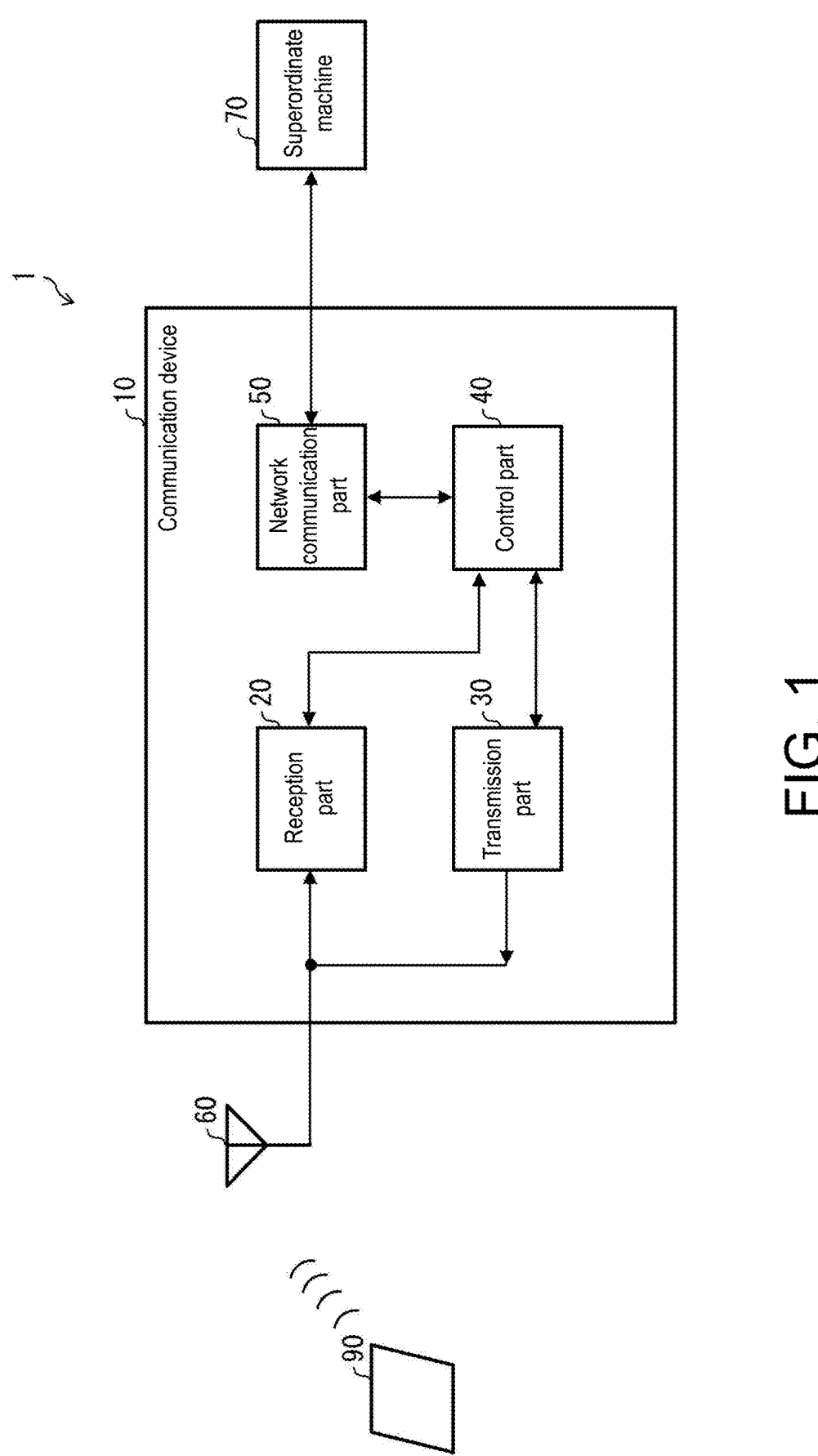
FIG. 1 is a schematic diagram illustrating a communication device according to Embodiment 1 of the disclosure and a communication system in which the communication device is applied.

An aspect of the disclosure provides a communication device. The communication device includes a reception part, demodulating a signal subjected to frequency shift keying by using a high bit and a low bit that are binary values. The reception part has: a detection part, detecting a first bit, which is one of the high bit and the low bit, from the signal that is received along a time line; and an estimation part, estimating presence of a second bit, which is a bit different from the first bit, based on a length of the ongoing time during which the detection part is unable to detect the first bit. According to the aspect, a communication device capable of reducing communication errors can be realized.

According to the above aspect, it may also be that the detection part has: a filter part, allowing, in the signal that is received, a frequency component corresponding to the first bit to pass through and reducing a frequency component corresponding to the second bit. According to the aspect, a communication device capable of effectively reducing communication errors in a setting environment of the communication where a noise component at the frequency corresponding to the second bit is present is realized.

According to the above aspect, it may also be that the detection part has a binarization part, applying a threshold relating to the magnitude with respect to the signal passing through the filter part to generate a binary signal. According to the aspect, a communication capable of correctly detecting the first bit in the signal subjected to frequency offset keying, if the first bit is presented in the amplitude of a predetermined period is realized.

According to the above aspect, it may also be that the binarization part performs a hysteresis operation by applying two thresholds. According to the aspect, a communication device capable of correctly detecting the first bits is realized.

According to the above aspect, it may also be that the detection part has: a first bit detection part, detecting the first bit based on a number of times of changes of a value in the binary signal. According to the aspect, a communication device capable of correctly and easily detecting the first bits is realized.

According to the above aspect, it may also be that the detection part has an A/D conversion part, performing A/D conversion on the signal passing through the filter part. According to the aspect, the communication device can be easily realized.

According to the above aspect, it may also be that the detection part has: an A/D conversion part, performing A/D conversion on the signal that is received; a division signal generation part, generating a division signal in which a predetermined time width is cut out from a digital signal output by the A/D conversion part; a frequency component magnitude calculation part, in order, calculating the magnitude of a frequency component corresponding to the first bit in the division signal, for a plurality of the division signals; and a first bit detection part, detecting the first bit based on time-series data of the magnitudes calculated in order by the frequency component magnitude calculation part. According to the aspect, a communication device capable of effectively reducing communication errors in a setting environment of the communication where a noise component at the frequency corresponding to the second bit is present is realized.

According to the above aspect, it may also be that the reception part further has: a noise evaluation part, performing evaluation on an electromagnetic wave magnitude of a frequency band domain including a frequency component corresponding to the first bit and an electromagnetic wave magnitude of a frequency band domain including a frequency component corresponding to the second bit in an environment in which the communication device is set; a determination part, performing determination on whether the high bit or the low bit is assigned to the first bit based on a result the evaluation performed by the noise evaluation part; and a setting part, switching a configuration of the reception part based on a result of the determination by the determination part. According to the aspect, it is possible to realize a communication device capable of effectively reducing the communication errors in correspondence with the situation of the noise component in the setting environment of the communication device.

According to the above aspect, it may also be that the noise evaluation part has: a first filter part, allowing an electrical signal of a frequency band including a frequency component corresponding to the first bit to pass through and reducing an electrical signal of a frequency band including a frequency component corresponding to the second bit; and a second filter part, allowing the electrical signal of the frequency band including the frequency component corresponding to the second bit to pass through and reducing the electrical signal of the frequency band including the frequency component corresponding to the first bit. According to the aspect, a communication device including a noise evaluation part capable of properly performing evaluation on an electromagnetic wave magnitude of a frequency band domain including a frequency component corresponding to the first bit and an electromagnetic wave magnitude of a frequency band domain including a frequency component corresponding to the second bit in an environment in which the communication device is set is realized.

According to the above aspect, it may also be that the signal includes a first portion corresponding to a preamble configured so that a plurality of one of the high bit and the low bit are consecutively arranged, and the reception part further has: a determination part, performing determination on whether the high bit or the low bit is assigned to the first bit by using at least one of a state of an magnitude of a frequency component corresponding to the high bit or a state of an magnitude of a frequency component corresponding to the low bit in the first portion of the signal that is received; and a setting part, switching a configuration of the reception part based on a result of the determination by the determination part. According to the aspect, it is possible to realize a communication device capable of effectively reducing the communication errors in correspondence with the situation of the noise component in the setting environment of the communication device.

In order to solve the above issues, another aspect of the disclosure provides a communication device. The communication device includes a reception part, demodulating a signal subjected to frequency shift keying by using a high bit and a low bit that are binary values. The reception part further has: a high bit detection part, detecting the high bit along a time line from the signal that is received; a low bit estimation part, estimating presence of the low bit and outputting a first bit string in which the signal is temporarily demodulated based on a length of the ongoing time during which the high bit detection part is unable to detect the high bit; a low bit detection part, detecting the low bit along the time line from the signal that is received; a high bit estimation part, estimating presence of the high bit and outputting a second bit string in which the signal is temporarily demodulated based on a length of the ongoing time during which the low bit detection part is unable to detect low bits; a demodulation part, outputting a third bit string in which the signal is temporarily demodulated from the signal that is received; and a bit determination part, determining a bit string in which the signal is demodulated through comparison among the first bit string, the second bit string, and the third bit string. According to the aspect, a communication device capable of reducing communication errors can be realized.

According to the above aspect, it may also be that the communication device further includes a transmission part, wirelessly transmitting a command with respect to a slave device, the signal is configured as a wireless response from the slave device with respect to the command.

According to the aspect, a communication device applicable to a communication system using a wireless response from a slave device with respect to the command and capable of effectively reducing communication errors is realized.

According to the above aspect, it may also be that, the communication device is an RFID reader. According to the aspect, an RFID reader capable of reducing communication errors is realized.

In order to solve the above issues, yet another aspect of the disclosure provides a signal modulation method. The signal modulation method is a signal demodulation method for demodulating a signal subjected to frequency shift keying by using a high bit and a low bit that are binary values. The signal demodulation method includes: a step of detecting a first bit, which is one of the high bit and the low bit, from the signal along a time line; and a step of estimating presence of a second bit, which is a bit different from the first bit, based on a length of the ongoing time during which the first bit is unable to be detected. According to the aspect, a signal demodulation method capable of reducing communication errors is realized.

According to an aspect of the disclosure, a communication device capable of reducing communication errors can be realized.

1. Application Example

Figure 2:
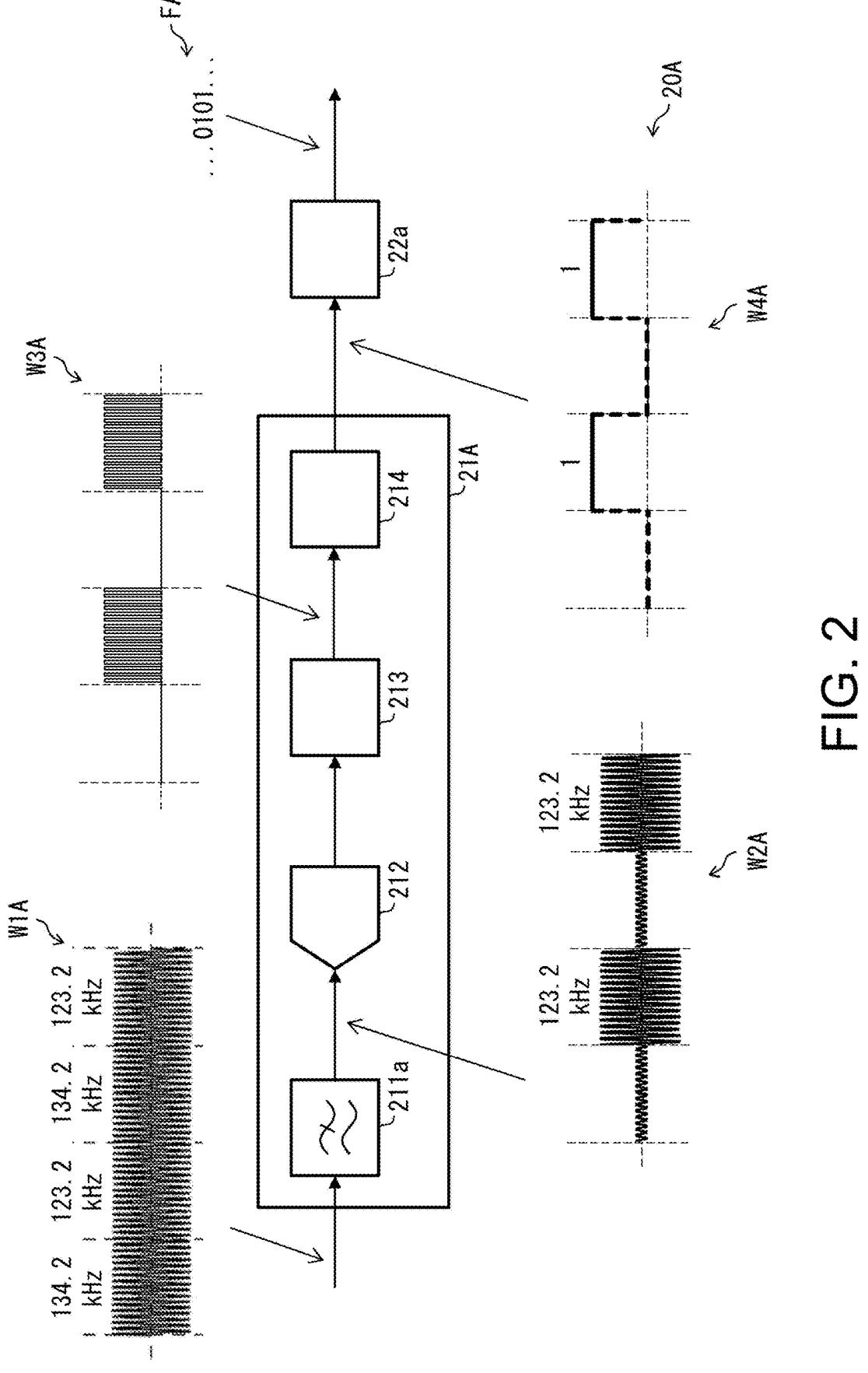
FIG. 2 is a functional block diagram illustrating a configuration of main components of a reception part of the communication device according to Embodiment 1 of the disclosure.

A communication device 10 whose configuration is shown with FIGS. 1 and 2 is an example of a communication device according to an application example of the disclosure. The communication device 10 includes a reception part 20 (reception part 20A) demodulating a signal subjected to frequency shift keying by using binary values of a high bit and a low bit.

The reception part 20 (reception part 20A) has a detection part 21A. The detection part 21A detects a first bit (high bit: 1 in FIG. 2), which is one of the high bit and the low bit, from the signal that is received along a time line. In addition, the reception part 20 (reception part 20A) has a low bit estimation part 22a (estimation part). The low bit estimation part 22a estimates the presence of a second bit (low bit: 0 in FIG. 2) that is a bit different from the first bit based on the length of the ongoing time during which the detection part 21A is unable to detect the first bit.

Figure 6:
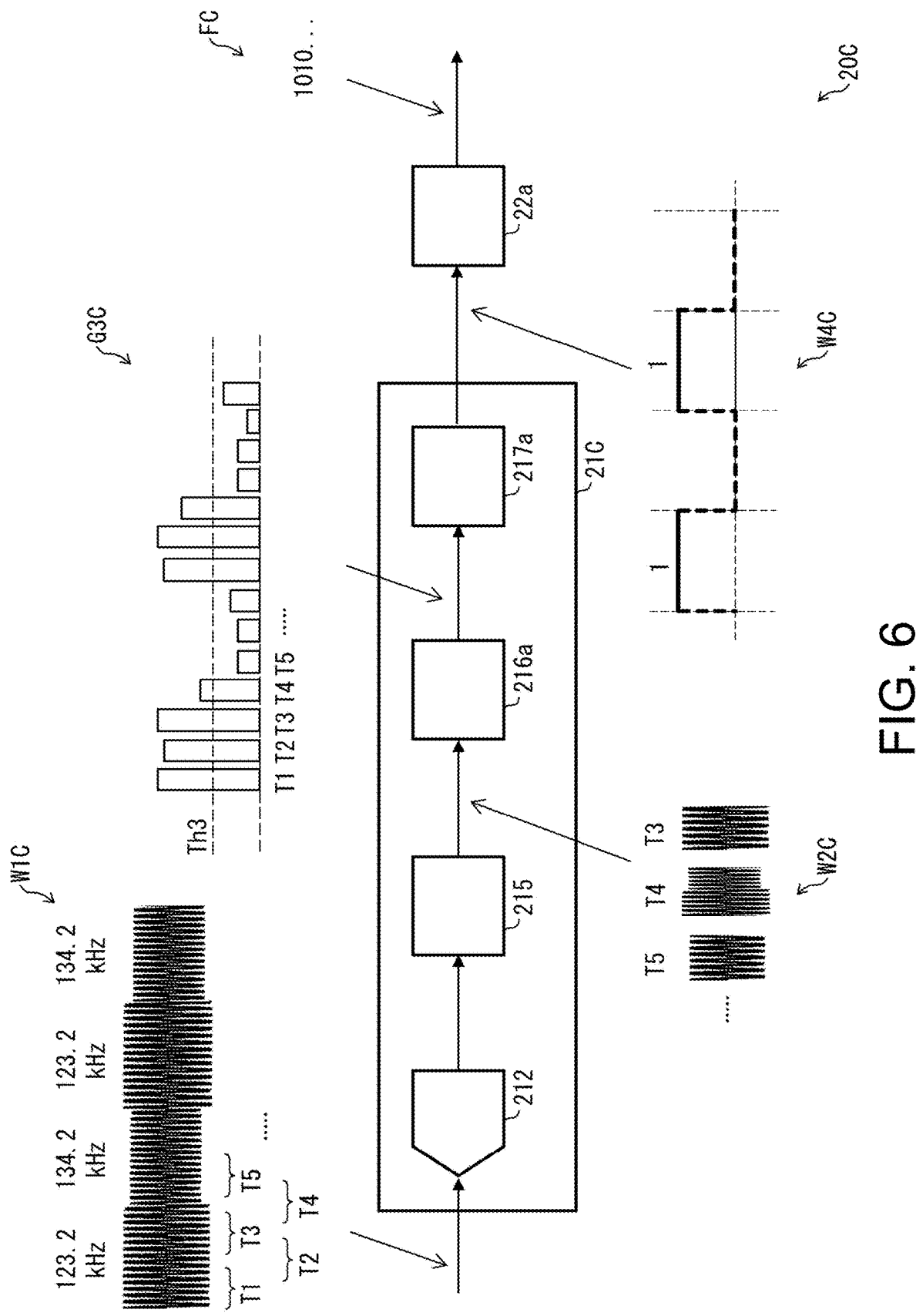
FIG. 6 is a functional block diagram illustrating a configuration of main components of a reception part of the communication device according to Embodiment 3 of the disclosure.

The communication device 10 whose configuration is shown with FIGS. 1 and 6 is also an example of the communication device according to the application example of the disclosure.

The communication device 10 includes a reception part 20 (reception part 20C) demodulating a signal subjected to frequency shift keying by using the binary values of the high bit and the low bit. The reception part 20 (reception part 20C) has a detection part 21C. The detection part 21C detects the first bit (high bit: 1 in FIG. 6), which is one of the high bit and the low bit, from the signal that is received along the time line.

In addition, the reception part 20 (reception part 20C) has the low bit estimation part 22a (estimation part). The low bit estimation part 22a estimates the presence of second bit (low bit: 0 in FIG. 6) that is a bit different from the first bit based on the length of the ongoing time during which the detection part 21A is unable to detect the first bit. According to the application example of the disclosure, the communication device capable of reducing communication errors is realized.

2. Configuration Example

Embodiment 1

<Outline of Communication System>

In the following, an embodiment of the disclosure is described in detail. FIG. 1 is a schematic diagram illustrating a communication system 1 in which the communication device 10 according to Embodiment 1 of the disclosure is applied.

The communication system 1 is a passive RFID system in which electromagnetic waves of an LF band are used. The communication system 1 includes the communication device 10 and a superordinate machine 70 of the communication device 10 connected with the communication device through a suitable communication network. In addition, the communication system 1 includes a tag 90. An antenna 60 is connected with the communication device 10, and wireless communication can be carried out between the communication device 10 and the tag 90.

The tag 90 is also referred to as a wireless tag, an IC tag, an RFID tag, a transponder, etc., and is a conventional passive wireless device. The communication device 10 is also referred to as an RFID reader, a tag reader, an RFID reader/writer, solely a reader/writer, etc., and is a wireless communication device serving as a parent device of the tag 90. When the communication device 10 transmits a command through wireless communication by using the electromagnetic waves (electromagnetic fields) of the LF band, the tag 90 stores the energy transmitted by the electromagnetic waves as electric energy and receives the command.

Then, by using the stored electric energy, the tag 90 transmits a response with respect to the command to the communication device 10. However, the application of the disclosure is not limited to techniques relating to passive RFID systems, and may also be applied to an RFID system in which the tag is mounted with a power source, such as a battery.

<Communication Device>

The communication device 10 includes the reception part 20, a transmission part 30, a control part 40, and a network communication part 50. The reception part 20 is a functional block that acquires information transmitted by the tag 90 with respect to the communication device 10 from the signal received via the antenna 60.

The transmission part 30 is a functional block that transmits a command with respect to the tag 90 via the antenna 60 by using electromagnetic waves in the LF band as carrier waves. The network communication part 50 is a communication interface in which the communication device 10 performs communication with the superordinate machine 70, etc., via a suitable communication network. The control part 40 is an information processing device that realizes the functions of the communication device 10 by controlling the reception part 20, the reception part 30, and the network communication part 50.

For example, the control part 40 transmits a desired command toward the tag 90 as a slave device via the antenna 60 by controlling the transmission part 30 in accordance with an instruction of the superordinate machine 70 received via the network communication part 50. The control part 40 controls the reception part 20 to receive a response to the command from the tag 90, and acquires data demodulating the response from the reception part 20. In addition, the control part 40 communicates with the superordinate machine 70 via the network communication part 50, and transmits the desired information that is acquired from the data to the superordinate machine 70.

<Response of Tag>

In the following, the signal format, etc., relating to the response from the tag 90 (transponder) is described. The following description of the signal format and data format complies with the standards of ISO 11784/11785. The signal transmitted by the tag 90 is a frequency shift keying signal (referred to as FSK signal in the following) modulated by using binary values of the high bit (1 of binary values) and the low bit (0 of binary values).

The high bit in the modulated signal is represented by a signal amplitude waveform with 16 periods at a frequency of 123.2 kHz. The low bit in the modulated signal is represented by a signal amplitude waveform with 16 periods at a frequency of 134.2 kHz. That is, one high bit is transmitted in about 130 μs, and one low bit is transmitted in about 119 μs. The frequency of 134.2 kHz may also be the carrier wave frequency of the command signal transmitted by the communication device 10 as a reader/writer.

The response of the tag 90 to the communication device 10 is formed by a communication frame including a body part of fixed-length data of 112 bits, pre-bits as a preamble, and start bits of 8 bits following the pre-bits. The start bits have a fixed value of 0b0111110. The pre-bits are a sequence of approximately 16 consecutive 0's (low bits), such as 0b0000000000000000, before the tag 90 outputs the start bits. Here, "0b" is a symbol indicating that the following numerical sequence are binary numerical values.

<Reception part 20A>

FIG. 2 is a functional block diagram illustrating a configuration of the main components of the reception part 20A of the communication device 10 according to Embodiment 1. The reception part 20A shown in FIG. 2 is an example of the reception part 20 of the communication device 10 for Embodiment 1.

The reception part 20A has the detection part 21A that extracts and detects high bits from the FSK signal (see a signal waveform W1A) received by the communication device 10 from the tag 90. The detection part 21A has a first filter part 211a (filter part), an A/D conversion part 212, a binarization part 213, and a first bit detection part 214. These functional blocks processes the FSK signal input to the detection part 21A in the order as described. In addition, the reception part 20A has the low bit estimation part 22a that processes the signal output by the detection part 21A (first bit detection part 214) to estimates and supplements the presence of low bits.

<First filter part 211a>

The first filter part 211a is a functional block that allows a signal component at the frequency of 123.2 kHz that corresponds to the high bit to pass through, and reduces a signal component at the frequency of 134.2 kHz that corresponds to the low bit. The first filter part 211 may be is a low-pass filter or a band-pass filter that has such function.

When the FSK signal (see the signal waveform W1A) received from the tag 90 passes through the first filter part

211a, a signal (see a signal waveform w2A) in which the signal component at the frequency of 134.2 kHz that corresponds to the low bit is cut off is obtained. Even in the case where a noise component at the frequency of 134.2 kHz is overlapped with the signal received by the communication device 10, such noise component is cut off, and the signal is output from the first filter part 21a.

<A/D Conversion Part 212>

In Embodiment 1, the signal passing through the first filter part 211a is input to the A/D conversion part 212. The A/D conversion part 212 is a functional block that performs analog-digital conversion on a signal. Regarding the analog-digital conversion performed by the A/D conversion part 212, a convention method may be applied as appropriate. For example, the analog-digital conversion may be executed by using a comparator circuit. In addition, the sampling period for digital signals may be set by using a bit detection method based on conventional settings. Here, the sampling period of the analog-digital conversion by using the A/D conversion part 212 is set to be properly shorter than the period of 7.45 μs of the signal at the frequency 134.2 kHz corresponding to the low bit.

It may also be that the sampling period is set in the A/D conversion part 212, so that the period of 7.45 μs of the signal waveform of corresponding to the low bit is 10 to 20 times of the sampling period. By setting the upper limit of the sampling period to such value, the waveform of the signal output by the first filter part 211a can be properly represented as a digital discrete value required for subsequent processing. In addition, by setting the lower limit of the sampling period to such value, the sampling number is not increased excessively.

<Binarization Part 213>

The binarization part 213 generates and outputs a binary signal (corresponding to a signal waveform W3A) that is a signal binarized from the digital signal (corresponding to the signal waveform w2A) output by the A/D conversion part 213. The binarization part 213 is a functional block that converts, into one pulse, one period of an amplitude at a predetermined magnitude or more in the signal waveform input as a digital signal.

Figure 3:
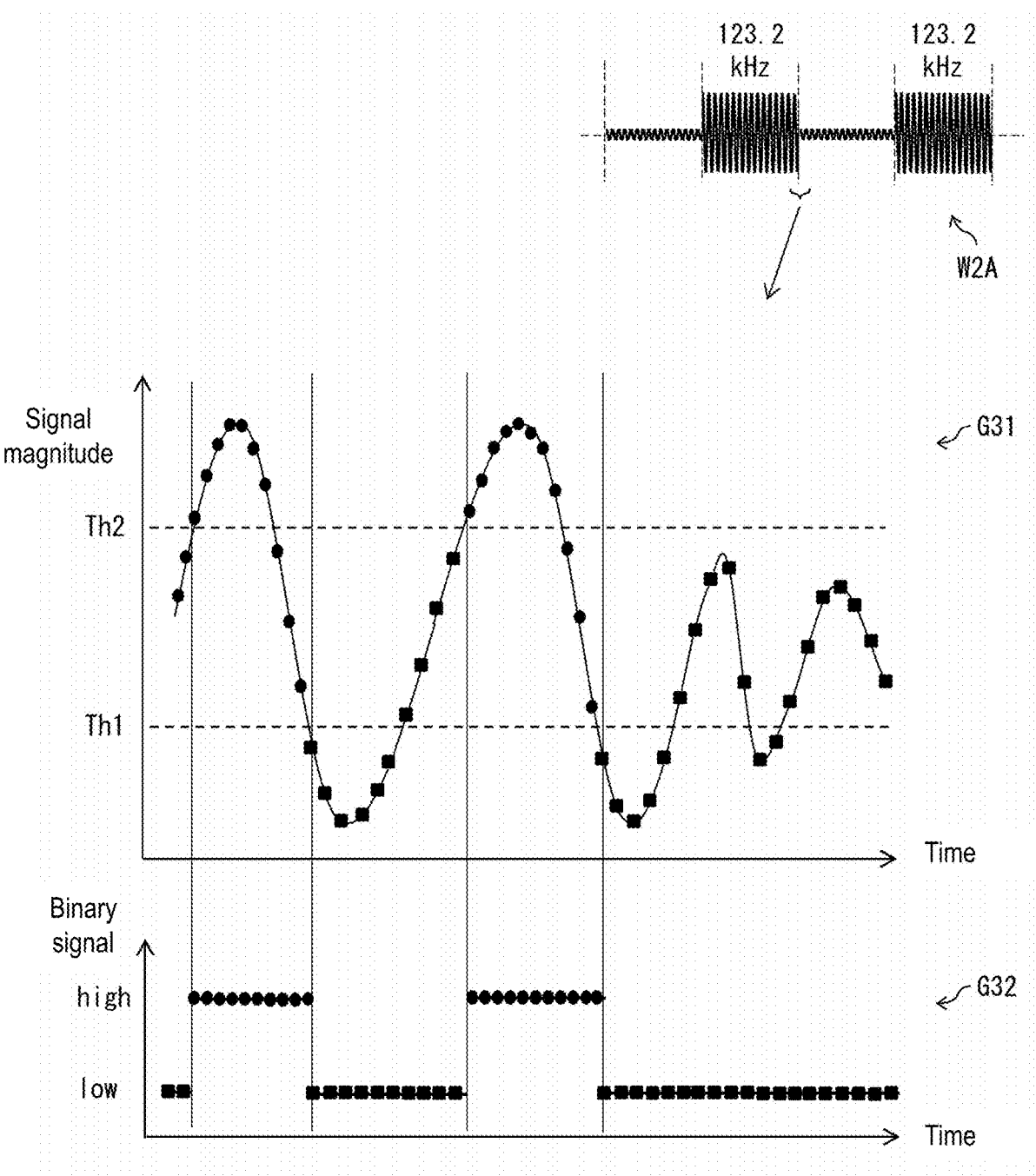
FIG. 3 is a diagram for illustrating an operation of a binarization part in the reception part of the communication device according to Embodiment 1 of the disclosure.

FIG. 3 is a diagram for illustrating the operation of the binarization part 213. The signal waveform W2A schematically represents the signal passing through the first filter part 211a. A graph G31 illustrates a waveform that enlarges a portion of the signal waveform W2A in the time line direction, and represents, by using dots, individual sampling data output by the A/D conversion part 212.

The interval between the dots in the horizontal axis direction in the graph G31 corresponds to the sampling period of the analog-digital conversion in the A/D conversion part 212. The vertical axis in the graph G31 represents the values of sampling data (referred to as sampling values in the following) that are the digital values of signal magnitude through A/D conversion. As shown in the dot-line in FIG. 3, in the binarization part 213, a threshold Th1 and a threshold Th2 are set for the sampling values.

The threshold Th1 and the threshold Th2 are equivalent to digital values obtained through A/D conversion and respectively corresponding to a negative amplitude value and a positive amplitude value of a predetermined amplitude substantially equal to the magnitude in the analog signal (corresponding to the signal waveform W2A) input to the A/D conversion part 212. That is, the median of the threshold Th1 and the threshold Th2 substantially corresponds to the amplitude of 0 of the FSK signal. The threshold Th2 is greater than the threshold Th1, and is also greater than the digital value obtained through the A/D conversion and corresponding to the amplitude of 0 of the FSK signal. The threshold Th1 is smaller than the digital value obtained through the A/D conversion and corresponding to the amplitude 0 of the FSK signal.

However, depending on the noise environment, it may not be necessary to set the threshold Th1 and the threshold Th2 in this way, and the threshold Th1 and the threshold Th2 may be set as appropriate. For example, in the case where a noise component is overlapped with the frequency component corresponding to the high bit, the threshold Th1 or the threshold Th2 may also be shifted in accordance with the magnitude thereof.

When the sampling value changes from a state of being less than the threshold Th2 to a state of being equal to or greater than the threshold Th2 in the time-series sampling data, the binarization part 213 assigns a binary value of high in correspondence with each sampling data until the next sampling value falls below or equal to the threshold Th1. In addition, when the sampling value changes from the state of being greater than the threshold Th1 to a state of being equal to or less than the threshold Th1, the binarization part 213 assigns a binary value of low corresponding to each sampling data, until the next sampling value becomes equal to or more than the threshold Th2.

In this way, the binarization part 213 generates binary signals obtained by converting, into binary values, the sampling values of the sampling data output by the A/D conversion part 212 represented as the graph G31 in FIG. 3. The time-series data obtained by being converted into binary values may be represented by a graph G32 in FIG. 3. In addition, in FIG. 2, the time-series data converted into binary values by the binarization part 213 are represented as the signal waveform W3A in the same scale in the time line direction with the signal waveform W2A representing the signal passing through the first filter part 211a.

In Embodiment 1, in a time region corresponding to the low bit in the FSK signal received from the tag 90, the binary value in the signal output by the binarization part 213 does not change. This is because, since the amplitude of the signal corresponding to the low bit is reduced through the first filter part 211a, a signal exceeding the range from the threshold Th1 to the threshold Th2 is not input to the binarization part 213, and the switching of the binary value in the signal output from the binarization part 213 does not occur.

Meanwhile, in Embodiment 1, in a time region corresponding to the high bit in the FSK signal received from the tag 90, a consecutive pulse series with a pulse number equal to the number of periods of the signal at the frequency of 123.2 kHz are generated in the signal output by the binarization part 213. Since the binarization part 213 performs a hysteresis operation by using the two thresholds according to the above, the transition of the binary signal near the change point between the low bit and the high bit in the FSK signal received from the tag 90 is stable without ringing.

<First Bit Detection Part 214>

The binary signal (corresponding to the signal waveform W3A) output by the binarization part 213 is processed by the first bit detection part 214. Since the frequency component corresponding to the high bit is selected by the first filter part 211a, the first bit detection part 214 in Embodiment 1 extracts high bits from the binary signal.

When detecting a pulse in the binary signal, that is, when detecting a change from the state of constantly being L to the state of high, the first bit detection part 214 starts counting the pulse number. When the pulse number reaches 16, the counting of the pulse number is reset, and the counting of the pulse number continues. In the case where there is no further pulses following the pulse number of 16, the counting of the pulse number stops.

The counting of pulses can be performed by counting signal changes, that is, the number of times in which the values increase or decrease, in the binary signal. The first bit detection part 214 detects pulses in the binary signal, and sets the interval until the pulse number reaches 16 as an interval where one high bit is present (see the signal waveform W4A).

In this way, the first bit detection part 214 generates a digital signal in which 16 consecutive pulses in the binary signal are replaced with the binary data of being high. Accordingly, the detection part 21A having the respective functional blocks from the first filter part 211a to the first bit detection part 214 detects only the high bit along the time line (see the solid line in the signal waveform W4A) from the FSK signal received from the tag 90.

The output of the first bit detection part 214 is also the output of the detection part 214. In this way, the detection part 21A outputs the signal (see the solid line in the signal waveform W4A) in which the high bit is detected along the time line from the FSK signal (see the signal waveform W1A) received by the detection part 21A from the tag 90.

Compared with the high bit in the FSK signal received by the communication device 10 from the tag 90, the position of the high bit in the time line direction in the signal output by the detection part 21A may be slightly deviated in terms of the start position and the end position. This is because, in the signal processing in the binarization part 213, a hysteresis operation is performed by using two thresholds as described above.

In addition, this is because, in the transition region between the high bit and the low bit in the FSK signal received by the reception part 20A, the waveform may be distorted. Moreover, this is because, with A/D conversion being used in the signal processing, there is no resolution equal to or less than the sampling period (sampling interval).

<Low Bit Estimation Part 22a>

The low bit estimation part 22a estimates that, during the output of the detection part 21A, a period in which the first bit detection part 214 have not extracted a high bit is a low bit period (see the dot-line in the signal waveform W4A).

The low bit estimation part 22a estimates the presence of low bits based on the length of the ongoing time during which a high bit cannot be detected in the signal in which only the high bits output by the detection part 21A are detected along the time line. In the signal output by the first bit detection part 214, the time interval between high bits is not necessarily an exact integer multiple of the low bit lasting duration (approximately 119 μs).

Therefore, the low bit estimation part 22a determines the number of low bits by calculating the most reliable value as the number of low bits included between high bits from the time interval between the high bits and the low bit lasting duration (about 119 μs). In addition, the low bit estimation part 22a similarly determines the number of high bits by calculating the most reliable value as the number of high bits included in the high bit lasting duration from the high bit lasting duration (the duration during which the actual signal lasts) and the lasting duration for one high bit (approximately 130 μs).

In this way, the low bit estimation part 22a calculates and outputs a bit string FA as the result of demodulating the communication frame of the response received by the reception part 20A from the tag 90. The bit string FA output by the low bit estimation part 22a is also the output of the reception part 20A.

<Functions, Effects, Etc.>

According to the communication device 10 according to Embodiment 1 or the signal demodulation method according to Embodiment 1, the frequency component corresponding to the low bits different from the first bits and serving as the second bits in the received FSK signal are cut off by the first filter part 211a. Therefore, even in the case where noise having a frequency component corresponding to the low bits as the second bits are overlapped with the received FSK signal, the response from the tag 90 can be accurately demodulated.

The reasons why the noise having a frequency component corresponding to the low bits is present may include, for example, that there are electromagnetic waves transmitted by readers/writers other than the communication device 10. In addition, machines such as a power supply unit, a motor, are also considered as the reasons of noises in the LF band. According to Embodiment 1, even in an environment where such noise source is present, a communication device with which the possibility that the communication stability with a tag is low is reduced is realized.

The detection part 21A of the communication device 10 in Embodiment 1 performs high bit detection based on the signal binarization by using the binarization part 213 and the pulse count obtained by using the first bit detection part 214. However, the detection part 21A may also perform high bit detection by applying another process, such as envelope detection, with respect to the signal passing through the first filter part 211a. In such case, the detection part 21A may also perform high bit detection based on the lasting duration of the binary value of high.

Embodiment 2

Another embodiment of the disclosure will be described in the following. For the ease of description, the same reference numerals will be used to refer to components having the same functions as those described in the above embodiment, and the description thereof will not be repeated. In the communication device 10 according to Embodiment 2, the configuration of the reception part 20 is different from the reception part 20A in Embodiment 1.

<Reception Part 20B>

Figure 4:
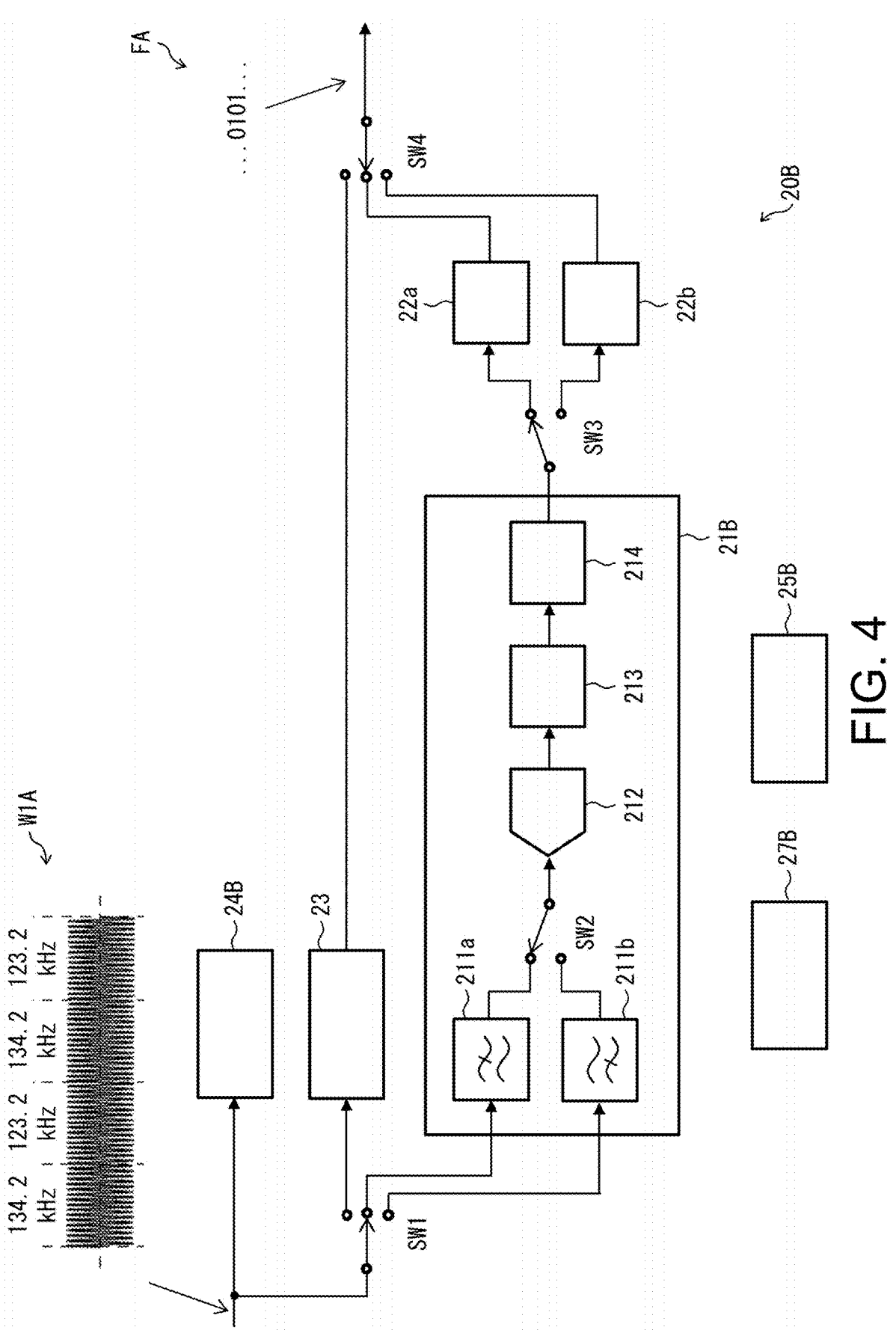
FIG. 4 is a functional block diagram illustrating a configuration of main components of a reception part of the communication device according to Embodiment 2 of the disclosure.

FIG. 4 is a functional block diagram illustrating a configuration of the reception part 20B of the communication device 10 according to Embodiment 2. The reception part 20B shown in FIG. 4 is an example of the reception part 20 of the communication device 10 for Embodiment 2.

The reception part 20B has a demodulation part 23 as a functional block that demodulates the FSK signal (see the signal waveform W1A) received from the tag 90 and outputs the bit string FA of the communication frame. The demodulation part 23 is configured by using a conventional demodulation circuit included in a conventional reader/writer. The demodulation part 23 directly detects both high and low bits from the FSK signal, and outputs the high and low bits as the bit string of the demodulated communication frame.

The detection part 21B of Embodiment 2 has a second filter part 21b (filter part), in addition to the respective functional blocks provided in the detection part 21A of Embodiment 1. The second filter part 211b allows a signal component at the frequency of 134.2 kHz corresponding to the low bit to pass through, and reduces a signal component at the frequency of 123.2 kHz corresponding to the high bit.

The second filter part 211b may be a high-pass filter or a band-pass filter that has such function.

The reception part 20B further has a high bit estimation part 22b (estimation part) in addition to the low bit estimation part 22a provided in the reception part 20A of Embodiment 1. The high bit estimation part 22b is a functional block that estimates the presence of high bits based on the length of the ongoing time during which a low bit cannot be detected in the signal in which only the low bits output by the detection part 21B are detected along the time line. That is, relative to the low bit estimation part 22a estimating and supplementing the presence of low bits by processing the signal output by the detection part 21B (the first bit detection part 214), the high bit estimation part 22b estimates and supplements the presence of high bits.

In addition, the reception part 20B has a noise evaluation part 24B, a determination part 25B, and a setting part 27B. The noise evaluation part 24B is a functional block that performs measurement on a noise component magnitude (background signal magnitude) at the frequency of 123.2 kHz and a noise component magnitude (background signal magnitude) at the frequency of 134.2 kHz in the environment in which the communication device 10 is set.

When demodulating the FSK signal (see the signal waveform W1A) received from the tag 90, the determination part 25B determines which of the high bit and the low bit is assigned to the first bit by the reception part 20B based on the measurement result of the noise evaluation part 24B. That is, the determination part 25B determines as which bit the first bit is set, the first bit being a bit extracted from the FSK signal for the reception part 20B to perform demodulation. Nevertheless, the determination result of the determination part 25B may also yield a conclusion other than assigning the high bit to the first bit, assigning the low bit to the first bit.

The setting part 27B is a functional block that exerts control on the switching as to which functional block of the reception part 20B is used when the FSK signal (see the signal waveform W1A) is demodulated based on the determination result of the determination part 25B. Switching parts SW1 to SW4 are functional blocks that execute switching of the use of the functional blocks under the control of the setting part 27B.

<Operation>

Figure 5:
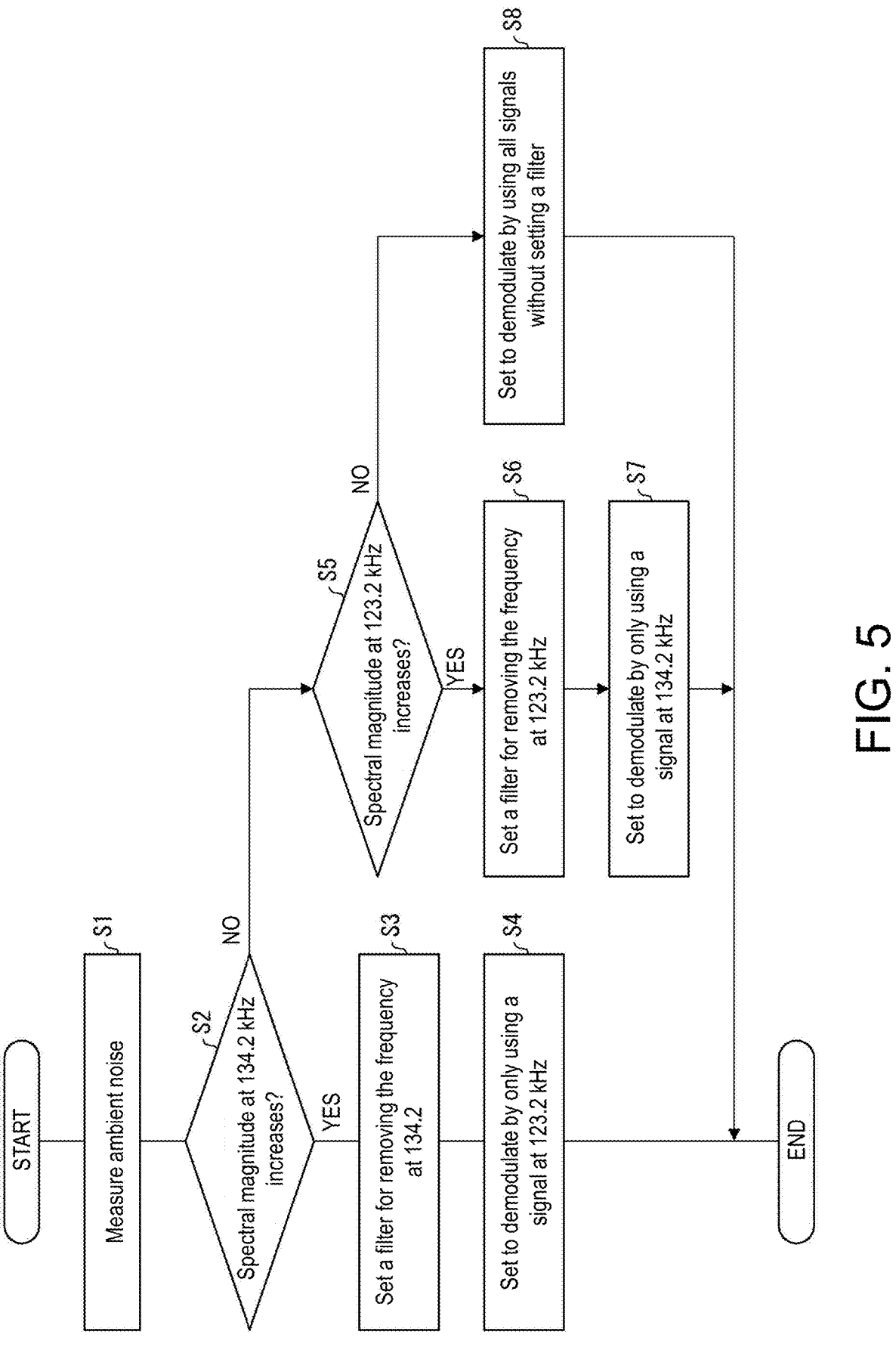
FIG. 5 is a flowchart illustrating an operation for setting switching of a demodulation process by using the communication device according to Embodiment 2 of the disclosure.

In the communication device 10 in Embodiment 2, the operation of demodulating the FSK signal received from the tag 90 is switched in accordance with the noise situation in the environment in which the communication device 10 is set. FIG. 5 is a flowchart illustrating the switching of such operation.

The communication device 10 according to Embodiment 2, before transmitting a command to the tag 90, executes the operation shown in the flowchart of FIG. 5 to select the functional block, that is, executes switching of the demodulation operation, and then transmits the command to the tag 90. In addition, the communication device 10 executes the demodulation of the response from the tag 90 by using the functional block set in the reception part 20B, that is, in accordance with the demodulation operation that is selected.

Step 1: In the reception part 20B, the noise evaluation part 24B obtains the background signal received by the antenna 60. The noise evaluation part 24B evaluates the spectral magnitude at the frequency of 134.2 kHz and the spectral magnitude at the frequency of 123.2 kHz in the background signal. Such spectral magnitude evaluation can be performed through a conventional process. For example, the noise evaluation part 24B can perform analog-digital conversion on the background signal and perform spectral magnitude evaluation by applying Fast Fourier Conversion (FFT).

Alternatively, the noise evaluation part 24B may also be configured to have the following two types of filter circuits. One of the two types is a band pass filter (first filter circuit) that allows a frequency domain including the frequency of 123.2 kHz to pass through and reduces a frequency domain including the frequency of 134.2, among the background signal (electromagnetic waves) received by the antenna 60. The other is a band pass filter (second filter circuit) that allows a frequency domain including the frequency of 134.2 kHz to pass through and reduces a frequency domain including the frequency of 123.2, among the background signal (electromagnetic waves) received by the antenna 60. In addition, the noise evaluation part 24B may also perform noise evaluation by using the magnitude of the background signal passing through each band pass filter. The band pass filter in the noise evaluation part 24B may share a circuit with the first filter part 211a and the second filter part 211b.

Step 2: Then, the determination part 25B determines whether the spectral magnitude at the frequency of 134.2 kHz is greater than a predetermined value from the evaluation result of the noise evaluation part 24B. In the case where it is determined that the spectral magnitude at the frequency of 134.2 kHz is greater than the predetermined value, the flow proceeds to Step S3 (YES in S2). Otherwise, the flow proceeds to Step S5 (NO in S2).

Step S3: The setting part 27B selects, as the filter in the detection part 21B, the first filter part 211a that cuts off the frequency of 134.2 kHz. That is, the setting part 27B controls the switching part SW1 and the switching part SW2 of the functional block diagram of FIG. 4 and selects to apply the first filter part 211a to the signal processing for demodulation.

Step S4: Then, the setting part 27B selects the low bit estimation part 22a, as the estimation part in the reception part 20B, that estimates and supplements the presence of low bits by processing the signal output by the detection part 21B. That is, the setting part 27B controls the switching part SW3 and the switching part SW4 in the functional diagram of FIG. 4 and selects to apply the low bit estimation part 22a to the signal processing for demodulation.

In the case where the flow proceeds to Step S4, the setting part 27B selects the first filter part 211a, the A/D conversion part 212, the binarization part 213, the first bit detection part 214, and the low bit estimation part 22a as the functional blocks for demodulating the FSK signal received from the tag 90. That is, in such case, in the reception part 20B, the process of demodulation with respect to the FSK signal received from the tag 90 is set to be completely the same as Embodiment 1. In other words, in such case, the detection part 21B assigns the high bits as the first bits extracted from the FSK signal. Then, the flow ends.

Step 5: The determination part 25B determines whether the spectral magnitude at the frequency of 123.2 kHz is greater than a predetermined value from the evaluation result of the noise evaluation part 24B. In the case where the determination part 25B determines that the spectral magnitude at the frequency of 123.2 kHz is greater than the predetermined value, the flow proceeds to Step S6 (YES in S5). Otherwise, the flow proceeds to Step S8 (NO in S8).

Step S6: The setting part 27B selects, as the filter in the detection part 21B, the second filter part 211b that cuts off the frequency of 123.2 kHz. That is, the setting part 27B controls the switching part SW1 and the switching part SW2 in the functional block diagram of FIG. 4 and selects to apply the second filter part 211b to the signal processing for demodulation.

Step S7: Then, the setting part 27B selects the high bit estimation part 22b, as the estimation part in the reception part 20B, that estimates and supplements the presence of high bits by processing the signal output by the detection part 21B. That is, the setting part 27B controls the switching part SW3 and the switching part SW4 in the functional block diagram of FIG. 4 and selects to apply the high bit estimation part 22b to the signal processing for demodulation.

In the case where the flow proceeds to Step S7, the setting part 27B selects the second filter part 211b, the A/D conversion part 212, the binarization part 213, the first bit detection part 214, and the high bit estimation part 22b as the functional blocks for demodulating the FSK signal received from the tag 90. In such case, in the detection part 21B, a process as follows is performed: the component at the frequency of 123.2 kHz corresponding to the high bit is cut off from the FSK signal received from the tag 90, and, different from the case of Embodiment 1, a process on the signal component at the frequency corresponding to the low bits is performed.

In such case, the detection part 21B detects only low bits along the time line from the FSK signal received from the tag 90. In addition, contrary to the operation of the low bit estimation part 22a, the high bit estimation part 22b supplements high bits with respect to the signal output by the detection part 21B.

Also, in such case, the detection part 21B selects low bits as the first bits extracted from the FSK signal. Therefore, in such case, the reception part 20B is set so that, even in the environment in which the noise component at the frequency of 123.2 kHz is high, the process for demodulating the FSK signal received from the tag 90 reduces the possibility that the communication stability is reduced. Then, the flow ends.

Step S8: The setting part 27B selects that the process of demodulation in the reception part 20B is performed by the demodulation part 23. That is, the setting part 27B controls the switching part SW1 and the switching part SW4 in the functional block diagram of FIG. 4, and selects to apply the demodulation part 23 to the signal processing for demodulation.

In this way, in the case where the noise components at the frequency corresponding to the high bits and at the frequency corresponding to the low bits are small in the setting environment of the communication device 10, the reception part 20B performs signal processing in a conventional reader/writer, which directly detects the high bits and the low bits. Then, the flow ends.

<Functions, Effects, Etc.>

According to the communication device 10 according to Embodiment 2 or the signal demodulation method according to Embodiment 2, the demodulation process with respect to the FSK signal received from the tag 90 can be selected by switching to a preferable method in accordance with the state of the interference noise in the setting environment. Therefore, according to Embodiment 2, a communication device that can reduce the possibility that the communication stability with the tag is reduced is realized.

In Embodiment 2, in the case where there is a concern that the result of the determination part 25B determining the situation of the noise in the environment in which the communication device 10 is set is that the influence of noise is significant, the communication device 10 may perform operations as follows. Examples of the case with such concern include the case where the noise component magnitude at the frequency of 123.2 kHz and the noise component magnitude at the frequency of 134.2 kHz are both high.

In the case with such concern, the communication device 10 may also delay the timing and then transmit a command, instead of immediately transmitting the command to the tag 90.

According to the operation, when the noise occurs in the situation in which the distances among multiple RFID readers are short, communication errors can be effectively reduced.

In Embodiment 2, the determination part 25B is configured to determine the noise situation in the environment in which the communication device 10 is set, and the setting part 27B switches the demodulation operation in accordance with the determination result. However, the communication device 10 may also be configured so that, instead of automatically switching the demodulation operation in accordance with the determination result of the determination part 25B, the setting part 27B presents the determination result to a superordinate machine of the communication device 10 or to the operator, for example.

In such case, when the superordinate machine or the operator follows the result and instructs the communication device 10 to switch the demodulation operation, it may also be configured that the communication device 10 switches the demodulation operation by using the setting part 27B based on such instruction. Alternatively, it may also be configured that, irrelevant of the determination made by the determination part 25B, the communication device 10 switches the demodulation operation in accordance with a compulsory instruction according to the superordinate machine or the operator.

Modified Example 1

Modified Example 1 is an embodiment of the communication device of the disclosure in which a portion of the configuration from Embodiment 1 is modified. In the communication device 10 of Modified Example 1, the low bit estimation part 22a of Embodiment is replaced with the high bit estimation part 22b (estimation part), and the low bit estimation part 22a of Embodiment 1 is replaced with the high bit estimation part 22b (estimation part).

That is, in the reception part 20 of the communication device 10 according to Modified Example 1, low bits are selected as the first bits extracted from the FSK signal. According to Modified Example 1, even in an environment in which the noise component at the frequency of 123.2 kHz is high, the communication device 10 able to reduce the possibility that the communication stability is reduced is realized. In the communication device 10 according to Embodiment 2, the demodulation operation in the reception part 20B in the case where the flow for switching the operation proceeds to Step S7 is the same as the demodulation operation in the communication device of Modified Example 1.

Embodiment 3

<Reception Part 20C>

FIG. 6 is a functional block diagram illustrating a configuration of the main components of the reception part 20C of the communication device 10 according to Embodiment 3. The reception part 20C shown in FIG. 6 is an example of the reception part 20 of the communication device 10 for Embodiment 3.

The reception part 20C has a detection part 21C that extracts and detects high bits from the FSK signal (see a signal waveform WIC) received by the communication device 10 from the tag 90. The detection part 21c has the A/D conversion part 212, a division signal generation part 215, a first frequency component magnitude calculation part 216a (frequency component magnitude calculation part) and a high bit detection part 217a (first bit detection part), in which the input FSK signal is processed in the order as described.

In addition, the reception part 20C has the low bit estimation part 22a that processes the signal output by the detection part 21C (high bit detection part 217a) to estimate and supplement the presence of low bits. In Embodiment 3, the functions of the A/D conversion part 212 and the low bit estimation part 22a are respectively the same as the functions of the A/D conversion part 212 and the low bit estimation part 22a.

<Division Signal Generation Part 215>

The division signal generation part 215 is a functional block that divides and outputs the FSK signal, which is a digital signal output by the A/D conversion part 212, to each division. The ranges of the respective divisions are schematically shown by using symbols of T1, T2, T3, . . . , in the signal waveform WIC of the FSK signal received from the tag 90 of FIG. 6.

The length of each division is set to be smaller than the lasting durations of the high bits and low bits. In addition, while each division signal is a signal obtained by cutting and dividing the FSK signal, adjacent divisions may contain overlapping portions of the original FSK signal. For example, the division signal of the division T3, for example, is provided in the initial portion of the period with a portion of the original FSK signal overlapping the division T2, and is provided in an end portion of the period with a portion of the original FSK signal overlapping the division T4.

The length of each division may be two-thirds or more of the lasting duration of one high bit or one low bit. In the FSK signal, it may be set that multiple divisions are assigned in correspondence with one high bit or one low bit. The number for such assignment may be about 3 to 10. Accordingly, the shift at the start position where each division is cut out with respect to the FSK signal may be about 10 to 40 μs.

<First Frequency Component Magnitude Calculation Part 216a>

The first frequency component magnitude calculation part 216a is a functional block (see a graph G3C) that calculates the spectral magnitude at the frequency 123.2 kHz corresponding to the high bit for the signal of each division (T1, T2, T3 . . . ) generated by the division signal generation part 215. The spectral magnitude can be calculated by using a conventional method. For example, the first frequency component magnitude calculation part 216a calculates the spectral magnitude by applying Fast Fourier Transform (FFT) to the signal of each division.

<High Bit Detection Part 217a>

Based on the spectral magnitude at the frequency corresponding to the high bit for each division that is calculated by the first frequency component magnitude calculation part 216a, the high bit detection part 217a generates the next digital signal. Regarding the time representing the division, if the spectral magnitude of the division is equal to or greater than a threshold Th3 (see the graph G3C), the division has a binary value of high.

The time representing the division is the time corresponding to the division in the FSK signal, and may be the time in the middle of the division. Here, the threshold Th3 is set to the vicinity of the center of the spectral magnitude corresponding to the case of the high bit and the spectral magnitude corresponding to the case of the low bit.

In addition, here, for example, the maximum in the communication frame regarding the spectral magnitude of each division or the average of the spectral magnitudes of several higher points may be considered as the spectral magnitude corresponding to the case of the high bit. In addition, the minimum in the communication frame regarding the spectral magnitude of each division or the average of the spectral magnitudes of several lower points may be considered as the spectral magnitude corresponding to the case of the low bit.

In this way, in the case where the spectral magnitude at the frequency corresponding to the high bit is high, a digital signal having the binary value of high is output at the time by using the first frequency component magnitude calculation part 216a and the high bit detection part 217a (see the solid line of a signal waveform W4D).

Compared with the high bit in the FSK signal received by the communication device 10 from the tag 90, the position of the high bit in the time line direction in the signal output by the detection part 21C may be slightly deviated in terms of the start position and the end position. This is because the binary value of high or low can also be determined in the first bit detection part 214 for the division including the transition region between the high bit and the low bit in the FSK signal.

In addition, this is because, in the transition region between the high bit and the low bit in the FSK signal received by the reception part 20A, the waveform may be distorted. Moreover, this is because, with A/D conversion being used for signal processing, there is no accuracy of the position in the time line direction equal to or less than the sampling period (sampling interval).

<Low Bit Estimation Part 22a>

Like the case of Embodiment 1, the low bit estimation part 22a calculates and outputs a bit string FC as the result of demodulating the communication frame of the response received by the reception part 20C from the tag 90. The bit string FC output by the low bit estimation part 22a is also the output of the reception part 20C.

<Functions, Effects, Etc.>

According to the communication device 10 according to Embodiment 3 or the signal demodulation method according to Embodiment 3, the frequency component corresponding to the low bits which are bits different from the first bits and serve as the second bits in the received FSK signal are not considered in the demodulation process. Therefore, even in the case where noise having a frequency component corresponding to the low bits as the second bits are overlapped with the received FSK signal, the response from the tag 90 can be accurately demodulated.

Embodiment 4

<Reception Part 20D>

Figure 7:
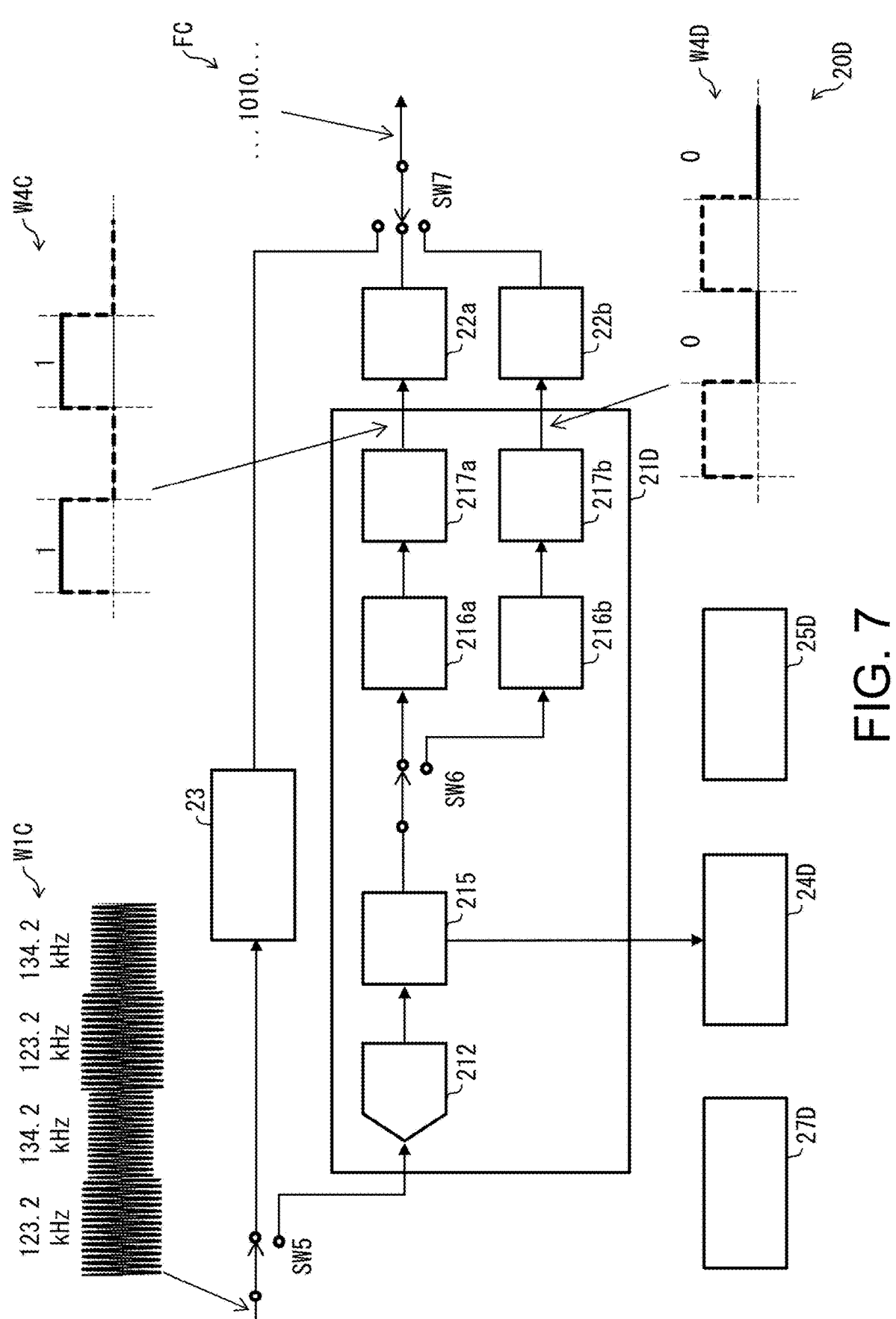
FIG. 7 is a functional block diagram illustrating a configuration of main components of a reception part of the communication device according to Embodiment 4 of the disclosure.

In the communication device 10 according to Embodiment 4, the configuration of the reception part 20 is different from the reception part 20C in Embodiment 3. FIG. 7 is a functional block diagram illustrating a configuration of a reception part 20D of the communication device 10 according to Embodiment 4. The reception part 20D shown in FIG. 7 is an example of the reception part 20 of the communication device 10 for Embodiment 4.

The reception part 20D has the demodulation part 23 as a functional block that demodulates the FSK signal (see the signal waveform W1C) received from the tag 90 and outputs the bit string FC of the communication frame. The reception part 20D further has the high bit estimation part 22b in addition to the low bit estimation part 22a provided in the reception part 20C of Embodiment 3. The functions of the demodulation part 23 and the high bit estimation part 22b are the same as those in the case of Embodiment 2.

A detection part 21D of Embodiment 4 has a second frequency component magnitude calculation part 216a (frequency component magnitude calculation part) and a low bit detection part 217b (first bit detection part), in addition to the respective functional blocks provided in the detection part 21C of Embodiment 3. The second frequency component magnitude calculation part 216b is different from the first frequency component magnitude calculation part 216a in terms of calculating the spectral magnitude at the frequency of 134.2 kHz corresponding to the low bit.

The low bit detection part 217b differs from the high bit detection part 217a in the point of outputting a digital signal in which low bits are detected based on the spectral magnitude corresponding to the low bit of each division calculated by the second frequency component magnitude calculation part 216b. If the spectral magnitude corresponding to the low bit of each division is equal to or greater than a threshold Th4, the low bit detection part 217b outputs the digital signal (see the solid line of the signal waveform W4D) possessing the binary value of low.

In the reception part 20D of Embodiment 4, the second frequency component magnitude calculation part 216b, the low bit detection part 217b, and the high bit estimation part 22b execute processes with respect to the signal of each division generated by the division signal generation part 215. By doing so, in the reception part 20D, it is possible to output the bit string FC as the result of demodulating the communication frame of the response by using the digital signal (see the solid line of the signal waveform W4D) in which the low bits are extracted as the second bits.

In addition, the reception part 20D has a noise evaluation part 24D, a determination part 25D, and a setting part 27D. The noise evaluation part 24D is a functional block that calculates the spectral magnitudes of the time domains corresponding to the pre-bits of the communication frame received by the communication device 10 from the tag 90. When demodulating the FSK signal (see the signal waveform W1A) received from the tag 90, the determination part 25D determines which of the high bit and the low bit is assigned to the first bit by the reception part 20D.

That is, the determination part 25D determines as which bit the first bit is set, the first bit being a bit extracted from the FSK signal for the reception part 20D to perform demodulation. Nevertheless, the determination result of the determination part 25D may also yield a conclusion other than that the high bit is assigned to the first bit and the low bit is assigned to the first bit.

The setting part 27D exerts control on the switching as to which functional block of the reception part 20D is used when the FSK signal (see the signal waveform W1A) received from the tag 90 is demodulated based on the determination result of the determination part 25D. Switching parts SW5 to SW7 are functional blocks that execute switching of the use of the functional blocks under the control of the setting part 27D.

<Operation>

Figure 8:
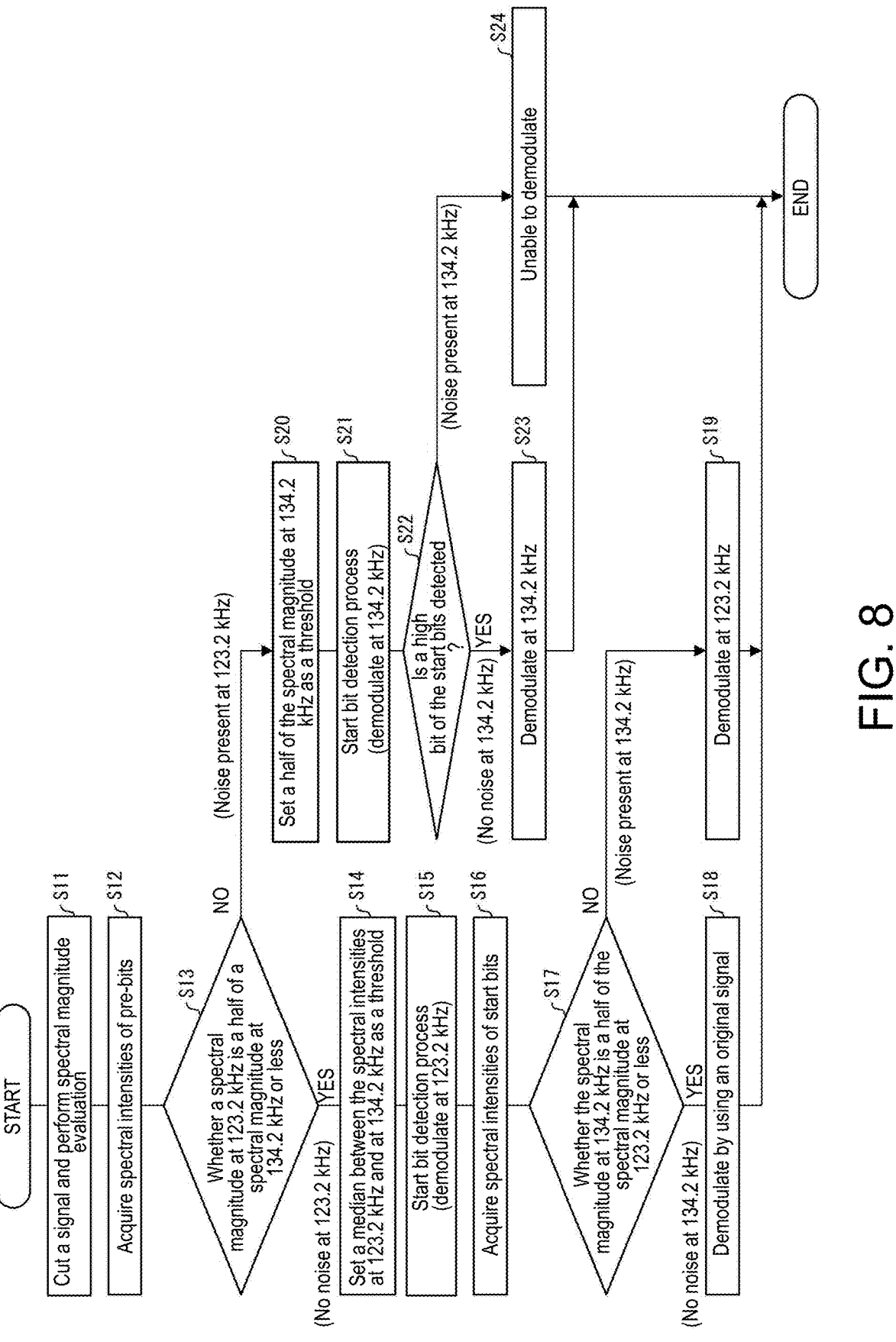
FIG. 8 is a flowchart illustrating an operation for setting switching of a demodulation process by using the communication device according to Embodiment 4 of the disclosure.

In the communication device 10 in Embodiment 4, the operation of demodulating the FSK signal received from the tag 90 is switched in accordance with the noise situation in the environment in which the communication device 10 is set. FIG. 8 is a flowchart illustrating the switching of such operation.

When receiving the response from the tag 90, the communication device 10 according to Embodiment 4 makes use of the preamble of the communication frame and performs selection of the functional blocks used in the demodulation process of the communication frame, that is, performs switching of the demodulation operation. In addition, the communication device 10 executes the demodulation of the response from the tag 90 by using the functional block set in the reception part 20D, that is, by using the demodulation operation that is selected.

Step S11: The determination part 25D calculates the spectral magnitude of each division of the communication frame for the FSK signal received in the noise evaluation part 24D from the tag 90 by controlling the A/D conversion part 212, the division signal generation part 215, and the noise evaluation part 24D. The noise evaluation part 24D calculates the spectral magnitude at the frequency at 123.2 kHz corresponding to the high bit and the spectral magnitude at the frequency of 134.2 kHz corresponding to the low bit in the interval.

Step S12: Then, the determination part 25D extracts the spectral magnitude of the division corresponding to the pre-bit among the spectral magnitudes of the respective divisions in the communication frame. According to the above, the pre-bits of the communication frame are formed by about 16 consecutive low bits (e.g., 0b0000000000000000). Accordingly, in the interval corresponding to the pre-bits of the communication frame, the waveform at the frequency 134.2 kHz in the signal from the tag 90 continues at maximum for 2.0 ms. The determination part 25D determines an interval corresponding to the pre-bits of the communication frame by using the end time of the command transmitted from the communication device 10 to the tag 90 as reference.

Step S13: Then, the determination part 25D determines whether the spectral magnitude at the frequency of 123.2 corresponding to the high bits is equal to or less than a half of the spectral magnitude at the frequency 134.2 corresponding to the low bits by using the spectral magnitudes in the interval corresponding to the pre-bits extracted in Step S12.

In the case where it is determined that the spectral magnitude at the frequency of 123.2 corresponding to the high bits is equal to or less than a half of the spectral magnitude at the frequency 134.2 corresponding to the low bits (YES in S13), the flow proceeds to Step S14. Otherwise (No in S13), the flow proceeds to Step S20. In the former case, it is determined that the noise component at the frequency of 123.2 kHz in the setting environment of the communication device 10 is small. In the latter case, the noise component is determined as large.

Step S14: The determination part 25D calculates the threshold Th3 with which the high bit detection part 217a performs binarization, by using the spectral magnitudes in the interval corresponding to the extracted pre-bits. The determination part 25D calculates, as the threshold Th3, the value at the center between the spectral magnitude at the frequency 123.2 kHz and the spectral magnitude at the frequency 134.2 kHz.

Step S15: Then, the determination part 25 operates the first frequency component magnitude calculation part 216a, the high bit detection part 217a, and the low bit estimation part 22a and demodulates data that include until at least the start bits of the communication frame. That is, the determination part 25D demodulates the data by detecting the signal of the frequency of 123.2 kHz corresponding to the high bit. Since the noise component at the frequency of 123.2 kHz in the setting environment of the communication device 10 is small, the high bits (1 of the binary values) in the start bits (0b01111110) can be demodulated.

Step S16: Then, the determination part 25D extracts the spectral magnitudes of the divisions corresponding to the interval in which the high bits of the start bits are consecutive from the spectral magnitudes of each division of the communication frame calculated by the noise evaluation part 24D. Since there are six consecutive high bits in the start bits of the communication frame, the lasting duration thereof is about 779 μs. The determination part 25D estimates the interval in which high bits are consecutive from the results of the processing of the first frequency component magnitude calculation part 216a, the high bit detection part 217a, and the low bit estimation part 22a in Step S15.

Step S17: Then, the determination part 25D determines whether the spectral magnitude at the frequency of 134.2 kHz corresponding to the low bits is equal to or less than a half of the spectral magnitude at the frequency of 123.2 kHz corresponding to the high bits by using the spectral magnitudes in the interval in which the high bits of the start bits extracted in Step S16 are consecutive.

In the case where it is determined that the spectral magnitude at the frequency of 134.2 corresponding to the low bits is equal to or less than a half of the spectral magnitude at the frequency 123.2 corresponding to the high bits (YES in S17), the flow proceeds to Step S18. Otherwise (No in S17), the flow proceeds to Step S19. In the former case, it is determined that the noise component at the frequency of 134.2 kHz in the setting environment of the communication device 10 is small. In the latter case, the noise component is determined as large.

Step S18: The setting part 27D selects that the process of demodulation in the reception part 20D is performed by the demodulation part 23. That is, the setting part 27D controls the switching part SW5 and the switching part SW7 in the functional block diagram of FIG. 7, and selects to apply the demodulation part 23 to the signal processing for demodulation.

In the case where the noise components at the frequency corresponding to the high bits and at the frequency corresponding to the low bits are small in the setting environment of the communication device 10, the reception part 20D performs signal processing in a conventional reader/writer, which directly detects the high bits and the low bits. This is because, in this case, it is determined that it is appropriate to carry out conventional demodulation processing. Then, the flow ends.

Step S19: The setting part 27D selects to perform the demodulation process in the reception part 20D by using the A/D conversion part 212, the division signal generation part 215, the first frequency component strength calculation part 216a, the high bit detection part 217a, and the low bit estimation part 22a. That is, the setting part 27D controls the switching part SW5 to the switching part SW7 in the functional block diagram of FIG. 7, and selects to apply the functional blocks to the signal processing for demodulation.

The demodulation process executed by the reception part 20D in such case is the same as the demodulation process executed by the reception part 20C of Embodiment 3. In other words, in such case, the detection part 21D assigns the high bits as the first bits extracted from the FSK signal. This is because it is determined that, in the setting environment of the communication device 10, the noise component at the frequency corresponding to the high bit is small, and the noise component at the frequency corresponding to the low bit is large. However, here, the value calculated in Step 14 may also be used for the threshold Th3 applied in the high bit detection part 217a. Then, the flow ends.

Step S20: The determination part 25D sets the threshold Th4 with which the low bit detection part 217b performs binarization by using the spectral magnitudes in the interval corresponding to the extracted pre-bits. The determination part 25D calculates a half value of the spectral magnitude at the frequency of 134.2 kHz as the threshold Th4.

Step S21: Then, the determination part 25 operates the second frequency component magnitude calculation part 216b, the low bit detection part 217b, and the high bit estimation part 22b and attempts to demodulate data that include until at least the start bits of the communication frame. That is, the determination part 25D attempts to demodulate the data by detecting the signal at the frequency of 134.2 kHz corresponding to the low bit.

Step S22: Then, the determination part 25D determines whether the high bits in the start bits have been detected in the interval corresponding to the preamble of the communication frame by using Step S21. In the case where it is determined that the high bits in the start bits have been detected (YES in S22), the flow then proceeds to Step S23. Otherwise (No in S22), the flow proceeds to Step S24. In the former case, it is determined that the noise component at the frequency of 134.2 kHz in the setting environment of the communication device 10 is small. In the latter case, the noise component is determined as large.

Step S23: The setting part 27D selects to perform the demodulation process in the reception part 20D by using the A/D conversion part 212, the division signal generation part 215, the second frequency component strength calculation part 216b, the low bit detection part 217b, and the high bit estimation part 22b. That is, the setting part 27D controls the switching part SW5 to the switching part SW7 in the functional block diagram of FIG. 7, and selects to apply the functional blocks to the signal processing for demodulation.

In this case, the demodulation process executed by the reception part 20D is different from the demodulation process executed by the reception part 20C of Embodiment 3, and only the frequency component corresponding to the low bit is extracted. In other words, in such case, the detection part 21D assigns the low bits as the first bits extracted from the FSK signal. This is because it is determined that, in the setting environment of the communication device 10, the noise component at the frequency corresponding to the low bit is small, and the noise component at the frequency corresponding to the high bit is large. Then, the flow ends.

Step S24: The determination part 25D determines that it is not possible to demodulate the response received from the tag 90 in the setting environment of the communication device 10. Then, the flow ends.

<Functions, Effects, Etc.>

According to the communication device 10 according to Embodiment 4 or the signal demodulation method according to Embodiment 4, the demodulation process with respect to the FSK signal received from the tag 90 can be selected by switching to a preferable method in accordance with the state of the interference noise in the setting environment. Therefore, according to Embodiment 4, a communication device that can reduce the possibility that the communication stability with the tag is reduced is realized.

Modified Example 2

Modified Example 2 is an embodiment of the communication device of the disclosure in which a portion of the configuration from Embodiment 3 is modified. In the communication device 10 according to Modified Example 2, the first frequency component magnitude calculation part 216a, the high bit detection part 217a, and the low bit estimation part 22a of Embodiment 3 are respectively replaced with the second frequency component magnitude calculation part 216b, the low bit detection part 217b, and the high bit estimation part 22b.

That is, in the reception part 20 of the communication device 10 according to Modified Example 2, low bits are selected as the first bits extracted from the FSK signal. According to Modified Example 1, even in an environment in which the noise component at the frequency of 123.2 kHz is high, the communication device 10 able to reduce the possibility that the communication stability is reduced is realized. In the communication device 10 according to Embodiment 3, the demodulation operation in the reception part 20C in the case where the flow for switching the operation proceeds to Step S23 is the same as the demodulation operation in the communication device of Modified Example 2.

Embodiment 5

<Reception Part 20E>

Figure 9:
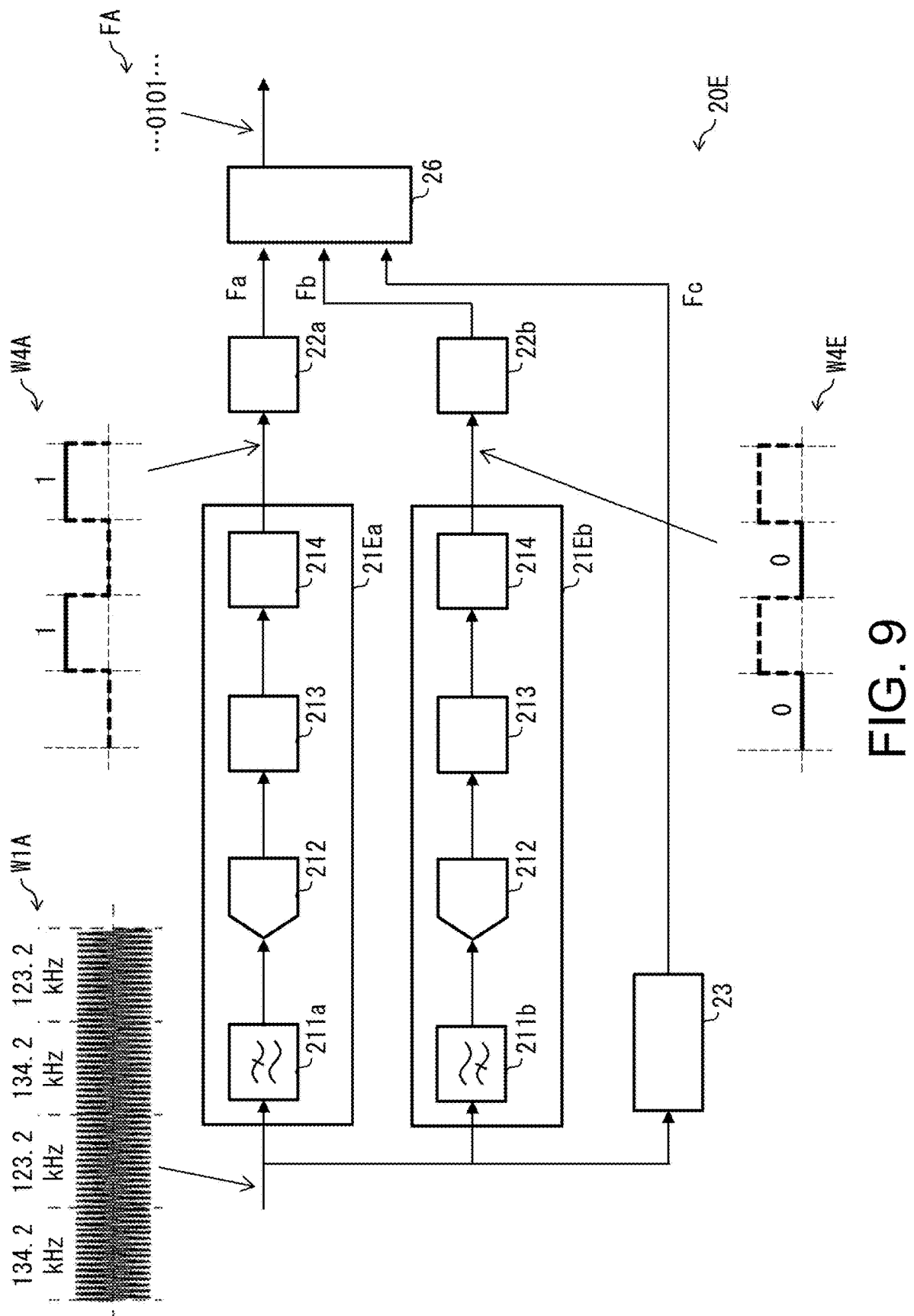
FIG. 9 is a functional block diagram illustrating a configuration of main components of a reception part of the communication device according to Embodiment 5 of the disclosure.

FIG. 9 is a functional block diagram illustrating a configuration of a reception part 20E of the communication device 10 according to Embodiment 5. The reception part 20E shown in FIG. 9 is an example of the reception part 20 of the communication device 10 for Embodiment 5.

The reception part 20E has a high bit detection part 21Ea that extracts and detects high bits from the FSK signal (see the signal waveform W1A) received by the communication device 10 from the tag 90. The high bit detection part 21Ea has the first filter part 211a, the A/D conversion part 212, the binarization part 213, and the first bit detection part 214. The function and configuration of the high bit detection part 21Ea are the same as those of the detection part 21A in Embodiment 1.

In addition, the reception part 20E has the low bit estimation part 22a that estimates and supplements, based on the length of the ongoing time during which the high bits cannot be detected, the presence of low bits from the signal (see the solid line of the signal waveform W4A) in which high bits are detected along the time line and which is output by the high bit detection part 21Ea. The function of the low bit estimation part 22a is the same as that in Embodiment 1.

Inside the reception part 20E, a bit string Fa in which the FSK signal received from the tag 90 is temporarily demodulated by using the high bit detection part 21Ea and the low bit estimation part 22a is calculated. Temporary demodulation indicates that the bit string Fa does not necessarily conforms to the bit string FA eventually output by the reception part 20E.

The reception part 20E has a low bit detection part 21Eb that extracts and detects low bits from the FSK signal received by the communication device 10 from the tag 90. The low bit detection part 21Eb has the second filter part 211b, the A/D conversion part 212, the binarization part 213, and the first bit detection part 214. The functions of the second filter part 211b, the A/D conversion part 212, the binarization part 213, and the first bit detection part 214 forming the low bit detection part 21Eb are the same as those in Embodiment 2, etc.

In addition, the reception part 20E has the high bit estimation part 22b that estimates and supplements, based on the length of the ongoing time during which low bits cannot be detected, the presence of high bits from the signal (see the solid line of a signal waveform W4E) in which low bits are detected along the time line and which are output by the low bit detection part 21Eb. The function of the high bit estimation part 22b is the same as that in Embodiment 2. In addition, inside the reception part 20E, a bit string Fb in which the FSK signal received from the tag 90 is temporarily demodulated by using the low bit detection part 21Eb and the high bit estimation part 22b is calculated.

In addition, the reception part 20E has the demodulation part 23 for demodulating the FSK signal received from the tag 90, without cutting off the signal component of the frequency of 123.2 kHz corresponding to the high bit and cutting off the signal component of the frequency of 134.2 kHz. The function of the demodulation part 23 is the same as that in Embodiment 2. In this way, inside the reception part 20E, a bit string Fc in which the FSK signal received from the tag 90 is temporarily demodulated by using the demodulation part 23 is calculated.

In addition, the reception part 20E has a bit determination part 26 that determines the bit string FA that is eventually output based on the bit string Fa, the bit string Fb, and the bit string Fc. The bit determination part 26 is a functional block that determines the bit string FA through the comparison among the bit string Fa, the bit string Fb, and the bit string Fc based on the following rule.

The specific operation of the bit determination part 26 is as follows. It is assumed that, among the bits at a position in each of the bit string Fa, the bit string Fb, the bit string Fc are all high bits (1). In such case, the bit determination part 26 determines the value of the bit at the position of the bit string FA to be output as the high bit (1).

It is assumed that, among the bits at a position in the bit string Fa, the bit string Fb, respectively, two of them are high bits (1), and one of them is a low bit (0). In such case, the bit determination part 26 determines the value of the bit at the position of the bit string FA to be output as the low bit (0).

It is assumed that, among the bits at a position in the bit string Fa, the bit string Fb, respectively, one of them is a high bit (1), and two of them are low bits (0). In such case, the bit determination part 26 determines the value of the bit at the position of the bit string FA to be output as the high bit (1).

It is assumed that, among the bits at a position in each of the bit string Fa, the bit string Fb, the bit string Fe are all low bits (0). In such case, the bit determination part 26 determines the bit at the position of the bit string FA to be output as the low bit (0).

<Functions, Effects, Etc.>

According to the communication device 10 according to Embodiment 5 or the signal demodulation method according to Embodiment 5, a communication device able to reduce the possibility of reducing the communication stability with the tag without switching of circuits in various situations of interference noises in the setting environment for the demodulation process with respect to the FSK signal received from the tag 90 is realized.

For example, the noise may interfere with the frequency component corresponding to the low bit in the environment in which the communication device 10 is set. In such case, it can be expected that the bit string Fa is correctly demodulated based on the extraction of the frequency component corresponding to a high bit. However, in such case, in the bit string Fb based on the extraction of the frequency component corresponding to a low bit or the bit string Fc that also detects the frequency component corresponding to a low bit, the high bit may be incorrectly demodulated as a low bit. Here, according to the communication device 10 according to Embodiment 5, the bit determination part 26 operates according to the above. Therefore, the FSK signal received from the tag 90 is correctly demodulated in the bit string FA output by the bit determination part 26.

In addition, for example, in the environment in which the communication device 10 is set, no interference of the noise of the frequency component corresponding to the low bit and the noise of the frequency component corresponding to the high bit is present. In such case, the bit string Fa, the bit string Fb, and the bit string Fc are correctly demodulated temporarily, and the bit string FA output by the bit determination part 26 is also correctly demodulated.

Implementation Example Using Software

The function of the communication device 10 (referred to as "device" in the following) can be realized by a program for causing a computer to function as the device, which is a program that causes a computer to function as the respective control blocks (particularly the control part 40 and the respective parts included in the reception part 20 and executes control or digital signal processing) of the device.

Examples of the respective parts included in the reception part 20 and executing control or digital signal processing include the binarization part 213, the first bit detection part 214, the division signal generation part 215, the first frequency component magnitude calculation part 216a, the second frequency component magnitude calculation part 216a, the high bit detection part 217a, the low bit detection part 217b, the low bit estimation part 22a, the high bit estimation part 22b, the noise evaluation part 24d, the determination part 25B, the determination part 25D, the setting part 27B, the setting part 27B.

In such case, the device includes, as the hardware for executing the program, at least one control device (e.g., a processor) and at least one storage device (e.g., a memory). By executing the program under the control device and the storage device, the respective functions described in the respective embodiments are realized.

The program may also be recorded in one or multiple recording media that are non-transient and computer-readable. The device may or may not be included in the recording medium.

In the latter case, the program may be supplied to the device via an arbitrary wired or wireless transmission medium.

In addition, some or all of the functions of the respective control blocks can be realized by using logic circuits. For example, an integrated circuit in which the logic circuits functioning as the respective control blocks are formed also fall within the scope of the disclosure. In addition, the functions of each of the control blocks can be realized by, for example, a quantum computer.

Furthermore, each process described in each embodiment may be executed by artificial intelligence (AI). In such case, the AI may operate on the control device, or on another device (e.g., an edge computer, a cloud server, etc.)

[Outline]

A communication device according to Aspect 1 of the disclosure includes: a reception part, demodulating a signal subjected to frequency shift keying by using a high bit and a low bit that are binary values. The reception part has: a detection part, detecting a first bit, which is one of the high bit and the low bit, from the signal that is received along a time line; and an estimation part, estimating presence of a second bit, which is a bit different from the first bit, based on a length of the ongoing time during which the detection part is unable to detect the first bit.

Regarding the communication device according to Aspect 2 of the disclosure, in Aspect 1, the detection part has: a filter part, allowing, in the signal that is received, a frequency component corresponding to the first bit to pass through and reducing a frequency component corresponding to the second bit.

Regarding the communication device according to Aspect 3 of the disclosure, in Aspect 2, the detection part has a binarization part, applying a threshold relating to magnitude with respect to the signal passing through the filter part to generate a binary signal.

Regarding the communication device according to Aspect 4 of the disclosure, in Aspect 3, the binarization part performs a hysteresis operation by applying two thresholds.

Regarding the communication device according to Aspect 5 of the disclosure, in Aspect 3 or 4, the detection part has: a first bit detection part, detecting the first bit based on a number of times of changes of a value in the binary signal.

Regarding the communication device according to Aspect 6 of the disclosure, in any one of Aspects 2 to 5, the detection part has an A/D conversion part, performing A/D conversion on the signal passing through the filter part.

Regarding the communication device according to Aspect 7 of the disclosure, in Aspect 1, the detection part has: an A/D conversion part, performing A/D conversion on the signal that is received; a division signal generation part, generating a division signal in which a predetermined time width is cut out from a digital signal output by the A/D conversion part; a frequency component magnitude calculation part, in order, calculating an magnitude of a frequency component corresponding to the first bit in the division signal, for a plurality of the division signals; and a first bit detection part, detecting the first bit based on time-series data of the magnitudes calculated in order by the frequency component magnitude calculation part.

Regarding the communication device according to Aspect 8 of the disclosure, in any one of Aspects 1 to 7, the reception part further has: a noise evaluation part, performing evaluation on an electromagnetic wave magnitude of a frequency band domain including a frequency component corresponding to the first bit and an electromagnetic wave magnitude of a frequency band domain including a frequency component corresponding to the second bit in an environment in which the communication device is set; a determination part, performing determination on whether the high bit or the low bit is assigned as the first bit based on a result the evaluation performed by the noise evaluation part; and a setting part, switching a configuration of the reception part based on a result of the determination by the determination part.

Regarding the communication device according to Aspect 9 of the disclosure, in Aspect 8, the noise evaluation part has: a first filter part, allowing an electrical signal of a frequency band including a frequency component corresponding to the first bit to pass through and reducing an electrical signal of a frequency band including a frequency component corresponding to the second bit; and a second filter part, allowing the electrical signal of the frequency band including the frequency component corresponding to the second bit to pass through and reducing the electrical signal of the frequency band including the frequency component corresponding to the first bit.

Regarding the communication device according to Aspect 10 of the disclosure, in any one of Aspects 1 to 7, the signal includes a first portion corresponding to a preamble configured so that a plurality of one of the high bit and the low bit are consecutively arranged, and the reception part has: a determination part, performing determination on whether the high bit or the low bit is assigned to the first bit by using at least one of a state of an magnitude of a frequency component corresponding to the high bit or a state of an magnitude of a frequency component corresponding to the low bit in the first portion of the signal that is received; and a setting part, switching a configuration of the reception part based on a result of the determination by the determination part.

A communication device according to Aspect 11 of the disclosure includes: a reception part, demodulating a signal subjected to frequency shift keying by using a high bit and a low bit that are binary values. The reception part further has: a high bit detection part, detecting the high bit along a time line from the signal that is received; a low bit estimation part, estimating presence of the low bit and outputting a first bit string in which the signal is temporarily demodulated based on a length of the ongoing time during which the high bit detection part is unable to detect the high bit; a low bit detection part, detecting the low bit along the time line from the signal that is received; a high bit estimation part, estimating presence of the high bit and outputting a second bit string in which the signal is temporarily demodulated based on a length of the ongoing time during which the low bit detection part is unable to detect low bits; a demodulation part, outputting a third bit string in which the signal is temporarily demodulated from the signal that is received; and a bit determination part, determining a bit string in which the signal is demodulated through comparison among the first bit string, the second bit string, and the third bit string.

Regarding the communication device according to Aspect 12 of the disclosure, in any one of Aspects 1 to 11, the communication device further includes a transmission part, wirelessly transmitting a command with respect to a slave device. The signal is configured as a wireless response from the slave device with respect to the command.

Regarding Aspect 13 of the disclosure, in any one of Aspects 1 to 12, the communication device is an RFID reader.

A signal demodulation method according to Aspect 14 of the disclosure is a signal demodulation method for demodulating a signal subjected to frequency shift keying by using a high bit and a low bit that are binary values. The signal demodulation method includes: a step of detecting a first bit, which is one of the high bit and the low bit, from the signal along a time line; and a step of estimating presence of a second bit, which is a bit different from the first bit, based on a length of the ongoing time during which the first bit is unable to be detected.

The disclosure is not limited to the above-described embodiments and modifications, but various modifications are possible within the scope of the claims. The technical scope of the disclosure also includes embodiments obtained by appropriately combining the technical means disclosed in the different embodiments and modifications.

What is claimed is:

1. A communication device, comprising:
   a reception part, demodulating a signal subjected to frequency shift keying by using a high bit and a low bit that are binary values,
   wherein the reception part has:

a detection part, detecting a first bit, which is one of the high bit and the low bit, from the signal that is received along a time line; and an estimation part, estimating presence of a second bit, which is a bit different from the first bit, based on a length of an ongoing time during which the detection part is unable to detect the first bit.

2. The communication device as claimed in claim 1, wherein the detection part has:

a filter part, allowing, in the signal that is received, a frequency component corresponding to the first bit to pass through and reducing a frequency component corresponding to the second bit.

3. The communication device as claimed in claim 2, wherein the detection part has:

a binarization part, applying a threshold relating to magnitude with respect to the signal passing through the filter part to generate a binary signal.

4. The communication device as claimed in claim 3, wherein the binarization part performs a hysteresis operation by applying two thresholds.

5. The communication device as claimed in claim 3, wherein the detection part has:

a first bit detection part, detecting the first bit based on a number of times of changes of a value in the binary signal.

6. The communication device as claimed in claim 3, wherein the detection part has:

an analog-to-digital (A/D) conversion part, performing A/D conversion on the signal passing through the filter part.

7. The communication device as claimed in claim 1, wherein the detection part has:

an analog-to-digital (A/D) conversion part, performing A/D conversion on the signal that is received;

a division signal generation part, generating a division signal in which a predetermined time width is cut out from a digital signal output by the A/D conversion part;

a frequency component magnitude calculation part, in order, calculating an magnitude of a frequency component corresponding to the first bit in the division signal, for a plurality of the division signals; and a first bit detection part, detecting the first bit based on time-series data of the magnitudes calculated in order by the frequency component magnitude calculation part.

8. The communication device as claimed in claim 1, wherein the reception part further has:

a noise evaluation part, performing evaluation on an electromagnetic wave magnitude of a frequency band domain comprising a frequency component corresponding to the first bit and an electromagnetic wave magnitude of a frequency band domain comprising a frequency component corresponding to the second bit in an environment in which the communication device is set;

a determination part, performing determination on whether the high bit or the low bit is assigned to the first bit based on a result the evaluation performed by the noise evaluation part; and a setting part, switching a configuration of the reception part based on a result of the determination by the determination part.

9. The communication device as claimed in claim 8, wherein the noise evaluation part has:

a first filter part, allowing an electrical signal of a frequency band comprising a frequency component corresponding to the first bit to pass through and reducing an electrical signal of a frequency band comprising a frequency component corresponding to the second bit; and a second filter part, allowing the electrical signal of the frequency band comprising the frequency component corresponding to the second bit to pass through and reducing the electrical signal of the frequency band comprising the frequency component corresponding to the first bit.

10. The communication device as claimed in claim 1, wherein the signal comprises a first portion corresponding to a preamble configured so that a plurality of one of the high bit and the low bit are consecutively arranged, and the reception part further has:

a determination part, performing determination on whether the high bit or the low bit is assigned to the first bit by using at least one of a state of an magnitude of a frequency component corresponding to the high bit or a state of an magnitude of a frequency component corresponding to the low bit in the first portion of the signal that is received; and a setting part, switching a configuration of the reception part based on a result of the determination by the determination part.

11. The communication device as claimed in claim 1, further comprising:

a transmission part, wirelessly transmitting a command with respect to a slave device, wherein the signal is a wireless response from the slave device with respect to the command.

12. A communication device, comprising:

a reception part, demodulating a signal subjected to frequency shift keying by using a high bit and a low bit that are binary values, wherein the reception part has:

a high bit detection part, detecting the high bit along a time line from the signal that is received; a low bit estimation part, estimating presence of the low bit and outputting a first bit string in which the signal is temporarily demodulated based on a length of an ongoing time during which the high bit detection part is unable to detect the high bit;

a low bit detection part, detecting the low bit along the time line from the signal that is received; a high bit estimation part, estimating presence of the high bit and outputting a second bit string in which the signal is temporarily demodulated based on a length of an ongoing time during which the low bit detection part is unable to detect low bits;

a demodulation part, outputting a third bit string in which the signal is temporarily demodulated from the signal that is received; and a bit determination part, determining a bit string in which the signal is demodulated through comparison among the first bit string, the second bit string, and the third bit string.

13. The communication device as claimed in claim 12, further comprising:

a transmission part, wirelessly transmitting a command with respect to a slave device, wherein the signal is a wireless response from the slave device with respect to the command.

14. The communication device as claimed in claim 13, wherein the communication device is an radio frequency identification (RFID) reader.

15. A signal demodulation method for demodulating a signal subjected to frequency shift keying by using a high bit and a low bit that are binary values, the signal demodulation method comprising:

a step of detecting a first bit, which is one of the high bit and the low bit, from the signal along a time line; and a step of estimating presence of a second bit, which is a bit different from the first bit, based on a length of an ongoing time during which the first bit is unable to be detected.

* * * * *